United States Patent
Fujimoto et al.

(10) Patent No.: US 11,754,830 B2
(45) Date of Patent: Sep. 12, 2023

(54) VIBRATION DEVICE AND VIBRATION CONTROL METHOD

(71) Applicant: Murata Manufacturing Co., Ltd., Nagaokakyo (JP)

(72) Inventors: Katsumi Fujimoto, Nagaokakyo (JP); Takahide Nakadoi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 228 days.

(21) Appl. No.: 17/320,283

(22) Filed: May 14, 2021

(65) Prior Publication Data

US 2021/0302723 A1   Sep. 30, 2021

Related U.S. Application Data

(63) Continuation of application No. PCT/JP2020/040641, filed on Oct. 29, 2020.

(30) Foreign Application Priority Data

Mar. 27, 2020   (JP) .................................. 2020-057845

(51) Int. Cl.
*G02B 27/00* (2006.01)
*B06B 1/02* (2006.01)
(Continued)

(52) U.S. Cl.
CPC ........ *G02B 27/0006* (2013.01); *B06B 1/0207* (2013.01); *B06B 1/0651* (2013.01);
(Continued)

(58) Field of Classification Search
CPC . B06B 1/0207; B06B 1/0651; B06B 2201/77; B08B 7/02
See application file for complete search history.

(56) References Cited

U.S. PATENT DOCUMENTS

2018/0095272 A1*  4/2018  Fujimoto ............... G03B 17/56
2018/0239218 A1*  8/2018  Ikeuchi .................. G03B 17/08
(Continued)

FOREIGN PATENT DOCUMENTS

EP    3885207 A1 *  9/2021  ............. B08B 11/00
JP    2007-082062 A    3/2007
(Continued)

OTHER PUBLICATIONS

Official Communication issued in International Patent Application No. PCT/JP2020/040641, dated Dec. 8, 2020.

*Primary Examiner* — Marc Carlson
(74) *Attorney, Agent, or Firm* — KEATING & BENNETT, LLP

(57) ABSTRACT

A vibration device includes a light transmissive body, a first cylindrical body, a plate-shaped spring portion, a second cylindrical body, and a vibrating body. The light transmissive body includes a main body portion on an inner side of a portion supported by the first cylindrical body, and a protruding portion extending from the main body portion toward an outer circumference of the light transmissive body and protruding outward more than a portion supported by the first cylindrical body. A ratio between an equivalent mass calculated from a moment of inertia of the protruding portion and a weight of the main body portion is about 0.8 to about 1.2, and a resonant frequency of the light transmissive body is larger than a resonant frequency of the spring portion.

20 Claims, 19 Drawing Sheets

(51) Int. Cl.
*B06B 1/06* (2006.01)
*B08B 7/02* (2006.01)
*B60S 1/62* (2006.01)

(52) U.S. Cl.
CPC ............ *B08B 7/02* (2013.01); *B06B 2201/77* (2013.01); *B60S 1/62* (2013.01)

(56) References Cited

U.S. PATENT DOCUMENTS

| | | | |
|---|---|---|---|
| 2018/0243804 A1* | 8/2018 | Magee | B08B 7/028 |
| 2018/0246323 A1* | 8/2018 | Fedigan | B08B 7/02 |
| 2019/0151897 A1* | 5/2019 | Fujimoto | B06B 1/06 |
| 2020/0038914 A1* | 2/2020 | Fujimoto | G02B 7/02 |
| 2020/0057301 A1* | 2/2020 | Kuratani | G03B 17/08 |
| 2020/0213495 A1* | 7/2020 | Fujimoto | B08B 7/04 |
| 2020/0379321 A1* | 12/2020 | Fujimoto | H10N 30/20 |
| 2021/0078043 A1* | 3/2021 | Ishii | G03B 11/04 |

FOREIGN PATENT DOCUMENTS

| | | | | |
|---|---|---|---|---|
| JP | 2013-080177 A | 5/2013 | | |
| JP | 2012-138768 A | 7/2017 | | |
| JP | 2017-170303 A | 9/2017 | | |
| JP | 6819844 B1 * | 1/2021 | ........... | B06B 1/0207 |
| WO | 2017/022382 A1 | 2/2017 | | |
| WO | 2017/110563 A1 | 6/2017 | | |
| WO | 2018/100796 A1 | 6/2018 | | |
| WO | 2018/198417 A1 | 11/2018 | | |
| WO | 2018/198465 A1 | 11/2018 | | |
| WO | WO-2018198465 A1 * | 11/2018 | ............... | B08B 7/02 |
| WO | WO-2018207395 A1 * | 11/2018 | ........... | B06B 1/0648 |
| WO | WO-2019030982 A1 * | 2/2019 | ............. | B08B 17/02 |
| WO | 2019/130629 A1 | 7/2019 | | |
| WO | WO-2019130629 A1 * | 7/2019 | ........... | B06B 1/0651 |
| WO | WO-2019225041 A1 * | 11/2019 | ........... | B06B 1/0261 |
| WO | 2020/003572 A1 | 1/2020 | | |
| WO | 2020/066088 A1 | 4/2020 | | |
| WO | WO-2020066088 A1 * | 4/2020 | ........... | B06B 1/0644 |
| WO | WO-2020217600 A1 * | 10/2020 | ............... | B08B 7/02 |

* cited by examiner

VIBRATION DEVICE AND VIBRATION CONTROL METHOD

CROSS REFERENCE TO RELATED APPLICATIONS

This application claims the benefit of priority to Japanese Patent Application No. 2020-057845 filed on Mar. 27, 2020 and is a Continuation Application of PCT Application No. PCT/JP2020/040641 filed on Oct. 29, 2020. The entire contents of each application are hereby incorporated herein by reference.

BACKGROUND OF THE INVENTION

1. Field of the Invention

The present invention relates to a vibration device and a vibration control method for removing liquid droplets and the like by vibration.

2. Description of the Related Art

Japanese Unexamined Patent Application Publication No. 2012-138768 discloses a dome-type surveillance camera system that suppresses adhesion of water droplets to a dome-shaped cover that becomes an obstacle in video monitoring. In the camera system described in Japanese Unexamined Patent Application Publication No. 2012-138768, when it is determined that a water droplet or a water film adheres to a dome-shaped cover, the water droplet adhering to the dome cover portion is removed by vibrating the vibration device.

In the system described in Japanese Unexamined Patent Application Publication No. 2012-138768, there is still room for improvement in that foreign matter adhering to a light transmissive body is removed while maintaining the field of view of the light transmissive body.

SUMMARY OF THE INVENTION

A vibration device according to a preferred embodiment of the present invention includes a light transmissive body to transmit light of a predetermined wavelength; a first cylindrical body having a cylindrical shape including a first end and a second end, and supporting the light transmissive body at the first end; a plate-shaped spring portion supporting the second end of the first cylindrical body; a second cylindrical body having a cylindrical shape including a first end and a second end, and supporting, at the first end, a position of the spring portion in an outer side portion of a position at which the first cylindrical body is supported; and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body, a ratio between an equivalent mass calculated from a moment of inertia of the protruding portion and a weight of the main body portion is equal to or more than about 0.8 and equal to or less than about 1.2, and the light transmissive body, and a resonant frequency of the light transmissive body is larger than a resonant frequency of the spring portion.

A vibration device according to a preferred embodiment of the present invention includes a light transmissive body to transmit light of a predetermined wavelength; a first cylindrical body having a cylindrical shape including a first end and a second end, and supporting the light transmissive body at the first end; a plate-shaped spring portion supporting the second end of the first cylindrical body; a second cylindrical body having a cylindrical shape including a first end and a second end, and supporting, at the first end, a position of the spring portion in an outer side portion of a position at which the first cylindrical body is supported; and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body, a ratio between a weight of the protruding portion and a weight of the main body portion is equal to or more than about 0.8 and equal to or less than about 1.2, and a resonant frequency of the light transmissive body is larger than a resonant frequency of the spring portion.

A vibration control method according to a preferred embodiment of the present invention includes preparing a vibration device including a light transmissive body to transmit light of a predetermined wavelength, a first cylindrical body that has a cylindrical shape including a first end and a second end and supports the light transmissive body at the first end, a plate-shaped spring portion that supports the second end of the first cylindrical body, a second cylindrical body that has a cylindrical shape including a first end and a second end and supports, at the first end, a position of the spring portion in an outer side portion of a position at which the first cylindrical body is supported, and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body; and vibrating the vibrating body; wherein the preparing includes setting a ratio between an equivalent mass calculated from a moment of inertia of the protruding portion and a weight of the main body portion to equal to or more than about 0.8 and equal to or less than about 1.2, and configuring the light transmissive body, the first cylindrical body, the spring portion, and the second cylindrical body such that a resonant frequency of the light transmissive body is larger than a resonant frequency of the spring portion.

A vibration control method according to a preferred embodiment of the present invention includes preparing a vibration device including a light transmissive body to transmit light of a predetermined wavelength, a first cylindrical body that has a cylindrical shape including a first end and a second end and supports the light transmissive body at the first end, a plate-shaped spring portion that supports the second end of the first cylindrical body, a second cylindrical body that has a cylindrical shape including a first end and a second end and supports, at the first end, a position of the spring portion in an outer side portion of a position at which the first cylindrical body is supported, and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body; and vibrating the vibrating body, wherein the preparing includes setting a ratio between a weight of the protruding portion and a weight of the main body portion to equal to or more than about 0.8 and equal to or less than about 1.2, and configuring the light transmissive body, the first cylindrical body, the spring portion, and the second cylindrical body such that a resonant frequency of the light transmissive body is larger than a resonant frequency of the spring portion.

According to preferred embodiments of the present invention, it is possible to provide vibration devices and vibration control methods that are each capable of removing foreign matter adhering to a light transmissive body while maintaining the field of view of the light transmissive body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
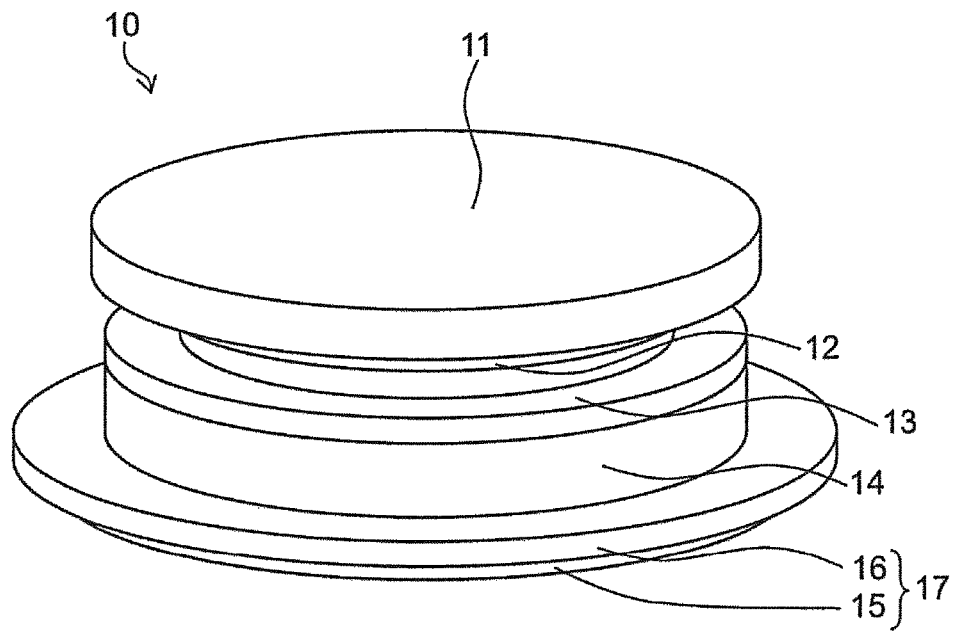
FIG. 1 is a schematic perspective view illustrating an example of a vibration device according to Preferred Embodiment 1 of the present invention.

In a vehicle including an imaging unit including an imaging element or the like in a front portion or a rear portion of a vehicle, a safety device is controlled using an image acquired by the imaging unit, or an automatic driving control is performed. Such an imaging unit may be provided outside of the vehicle. In this case, a light transmissive body, such as, for example, a protective cover, a lens, or the like is provided on an exterior of the imaging unit.

For this reason, foreign matter, such as, for example, raindrops (liquid droplets), mud, and dust may adhere to the light transmissive body. When the foreign matter adheres to the light transmissive body, the foreign matter may be reflected in the image acquired by the imaging unit, and a sharp image may not be obtained.

In recent years, there has been developed a vibration device that removes foreign matter adhering to a light transmissive body by vibrating the light transmissive body. When the light transmissive body is vibrated, the liquid droplet moves due to a difference in surface tension from a position where displacement is small to a position where displacement is large in the light transmissive body. The light transmissive body is often held on its outer periphery. For this reason, when the light transmissive body is vibrated, a central portion of the light transmissive body is likely to have a maximum displacement amount, and the liquid droplets tend to gather in the center of the light transmissive body. Therefore, a vibration device that atomizes liquid droplets in a central portion of a light transmissive body has also been proposed.

However, when the liquid droplets move to the central portion of the light transmissive body, the field of view of the central portion of the light transmissive body may be obstructed. For this reason, it is preferable to remove the liquid droplets (foreign matter) adhering to the light transmissive body while maintaining the field of view of the central portion of the light transmissive body.

The inventors of preferred embodiments of the present invention have conducted intensive studies and have discovered that in a vibration device including a light transmissive body, a first cylindrical body, a spring portion, a second cylindrical body, and a vibrating body, a protruding portion that protrudes from the first cylindrical body is provided in the light transmissive body, and a resonant frequency of the light transmissive body is larger than a resonant frequency of the spring portion. In this vibration device, the displacement of the central portion of the light transmissive body is canceled by the protruding portion of the light transmissive body, and the displacement amount of a peripheral portion of the light transmissive body is larger than that of the central portion of the light transmissive body. This makes it possible to remove liquid droplets by moving the liquid droplets from the central portion of the light transmissive body to the peripheral portion.

A vibration device according to a preferred embodiment of the present invention includes a light transmissive body to transmit light of a predetermined wavelength, a first cylindrical body having a cylindrical shape including a first end and a second end, and supporting the light transmissive body at the first end, a plate-shaped spring portion supporting the second end of the first cylindrical body, a second cylindrical body having a cylindrical shape including a first end and a second end, and supporting, at the first end, a position of the spring portion in an outer side portion of a position at which the first cylindrical body is supported, and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body, a ratio between an equivalent mass calculated from a moment of inertia of the protruding portion and a weight of the main body portion is equal to or more than about 0.8 and equal to or less than about 1.2, and a resonant frequency of the light transmissive body is larger than a resonant frequency of the spring portion.

With such a configuration, a displacement amount of the protruding portion can be larger than a displacement amount of the main body portion of the light transmissive body, and the foreign matter adhering to the light transmissive body can be removed while maintaining the field of view of the light transmissive body.

In the vibration device of the present preferred embodiment, a material of the protruding portion is different from a material of the main body portion.

With such a configuration, the weight of the protruding portion can be adjusted by the material of the protruding portion.

In the vibration device of the present preferred embodiment, the protruding portion may include one or a plurality of weights.

With such a configuration, the weight of the protruding portion can be adjusted by the weight.

In the vibration device of the present preferred embodiment, the vibrating body may include a plate-shaped vibration plate extending outward from the second end of the second cylindrical body, and a piezoelectric element on an upper surface or a lower surface of the vibration plate.

With such a configuration, the foreign matter adhering to the light transmissive body can be removed while maintaining the field of view of the light transmissive body more clear.

In the vibration device of the present preferred embodiment, the vibrating body may include a plate-shaped vibration plate extending inward from the second end of the second cylindrical body, and a piezoelectric element provided on an upper surface or a lower surface of the vibration plate.

With such a configuration, the foreign matter adhering to the light transmissive body can be removed while maintaining the field of view of the light transmissive body more clear.

In the vibration device of the present preferred embodiment, the light transmissive body may have a disk shape or a dome shape, the spring portion, the vibration plate, and the piezoelectric element may have an annular plate shape, for example, and the first cylindrical body and the second cylindrical body may have a cylinder shape.

With such a configuration, the foreign matter adhering to the light transmissive body can be removed while maintaining the field of view of the light transmissive body more clear.

In the vibration device of the present preferred embodiment, the vibrating body may include a plurality of piezoelectric elements on a side surface of the second cylindrical body and vibrating in a direction perpendicular or substantially perpendicular to a penetrating direction of the second cylindrical body.

With such a configuration, the foreign matter adhering to the light transmissive body can be removed while maintaining the field of view of the light transmissive body more clear.

The vibration device of the present preferred embodiment may further include an excitation circuit that excites the vibrating body.

With such a configuration, it is possible to vibrate the light transmissive body by vibrating the vibrating body.

A vibration device according to another preferred embodiment of the present invention includes a light transmissive body to transmit light of a predetermined wavelength, a first cylindrical body having a cylindrical shape including a first end and a second end, and supporting the light transmissive body at the first end, a plate-shaped spring portion supporting the second end of the first cylindrical body, a second cylindrical body having a cylindrical shape including a first end and a second end, and supporting, at the first end, a position of the spring portion in an outer side portion of a position at which the first cylindrical body is supported, and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body, a ratio between an equivalent mass calculated from a moment of inertia of the protruding portion and a weight of the main body portion is equal to or more than about 0.8 and equal to or less than about 1.2, and a resonant frequency of the light transmissive body is larger than a resonant frequency of the spring portion.

With such a configuration, the displacement amount of the protruding portion can be larger than the displacement amount of the main body portion of the light transmissive body, and the foreign matter adhering to the light transmissive body can be removed while maintaining the field of view of the light transmissive body.

In the vibration device of the present preferred embodiment, a material of the protruding portion may be different from a material of the main body portion.

With such a configuration, the weight of the protruding portion can be adjusted by the material of the protruding portion.

In the vibration device of the present preferred embodiment, the protruding portion may include one or a plurality of weights.

With such a configuration, the weight of the protruding portion can be adjusted by the weight.

In the vibration device of the present preferred embodiment, the vibrating body may include a plate-shaped vibration plate extending outward from the second end of the second cylindrical body, and a piezoelectric element provided on an upper surface or a lower surface of the vibration plate.

With such a configuration, the foreign matter adhering to the light transmissive body can be removed while maintaining the field of view of the light transmissive body more clear.

In the vibration device of the present preferred embodiment, the vibrating body may include a plate-shaped vibration plate extending inward from the second end of the second cylindrical body, and a piezoelectric element on an upper surface or a lower surface of the vibration plate.

With such a configuration, the foreign matter adhering to the light transmissive body can be removed while maintaining the field of view of the light transmissive body more clear.

In the vibration device of the present preferred embodiment, the light transmissive body may have a disk shape or a dome shape, the spring portion, the vibration plate, and the piezoelectric element may have an annular plate shape, and the first cylindrical body and the second cylindrical body may have a cylinder shape.

With such a configuration, the foreign matter adhering to the light transmissive body can be removed while maintaining the field of view of the light transmissive body more clear.

In the vibration device of the present preferred embodiment, the vibrating body may include a plurality of piezoelectric elements that is arranged on side surfaces of the second cylindrical body and vibrates in a direction perpendicular to a penetrating direction of the second cylindrical body.

With such a configuration, the foreign matter adhering to the light transmissive body can be removed while maintaining the field of view of the light transmissive body more clear.

The vibration device of the present preferred embodiment may further include an excitation circuit that excites the vibrating body.

With such a configuration, it is possible to vibrate the light transmissive body by vibrating the vibrating body.

A vibration control method according to another preferred embodiment of the present invention includes preparing a vibration device including a light transmissive body to transmit light of a predetermined wavelength, a first cylindrical body that has a cylindrical shape including a first end and a second end and supports the light transmissive body at the first end, a plate-shaped spring portion that supports the second end of the first cylindrical body, a second cylindrical body that has a cylindrical shape including a first end and a second end and supports, at the first end, a position of the spring portion in an outer side portion of a position at which the first cylindrical body is supported, and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body, and vibrating the vibrating body, wherein the preparing includes setting a ratio between an equivalent mass calculated from a moment of inertia of the protruding portion and a weight of the main body portion to equal to or more than about 0.8 and equal to or less than about 1.2, and configuring the light transmissive body, the first cylindrical body, the spring portion, and the second cylindrical body such that a resonant frequency of the light transmissive body is larger than a resonant frequency of the spring portion.

With such a configuration, the displacement amount of the protruding portion can be made larger than the displacement amount of the main body portion of the light transmissive body, and the foreign matter adhering to the light transmissive body can be removed while maintaining the field of view of the light transmissive body.

A vibration control method according to another preferred embodiment of the present invention includes preparing a vibration device including a light transmissive body to transmit light of a predetermined wavelength, a first cylindrical body that has a cylindrical shape including a first end and a second end and supports the light transmissive body at the first end, a plate-shaped spring portion that supports the second end of the first cylindrical body, a second cylindrical body that has a cylindrical shape including a first end and a second end and supports, at the first end, a position of the spring portion in an outer side portion of a position at which the first cylindrical body is supported, and a vibrating body on the second end side of the second cylindrical body to vibrate in a penetrating direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body, and vibrating the vibrating body, wherein the preparing includes setting a ratio between a weight of the protruding portion and a weight of the main body portion to equal to or more than about 0.8 and equal to or less than about 1.2, and configuring the light transmissive body, the first cylindrical body, the spring portion, and the second cylindrical body such that a resonant frequency of the light transmissive body is larger than a resonant frequency of the spring portion.

With such a configuration, the displacement amount of the protruding portion can be made larger than the displacement amount of the main body portion of the light transmissive body, and the foreign matter adhering to the light transmissive body can be removed while maintaining the field of view of the light transmissive body.

Hereinafter, preferred embodiments of the present invention will be described with reference to the accompanying drawings. Note that the following description is merely exemplary, and is not intended to limit the present invention, the application thereof, or the use thereof. Further, the drawings are schematic, and dimensional proportions and the like may not necessarily match actual ones.

Preferred Embodiment 1

Overall Configuration

Figure 2A:
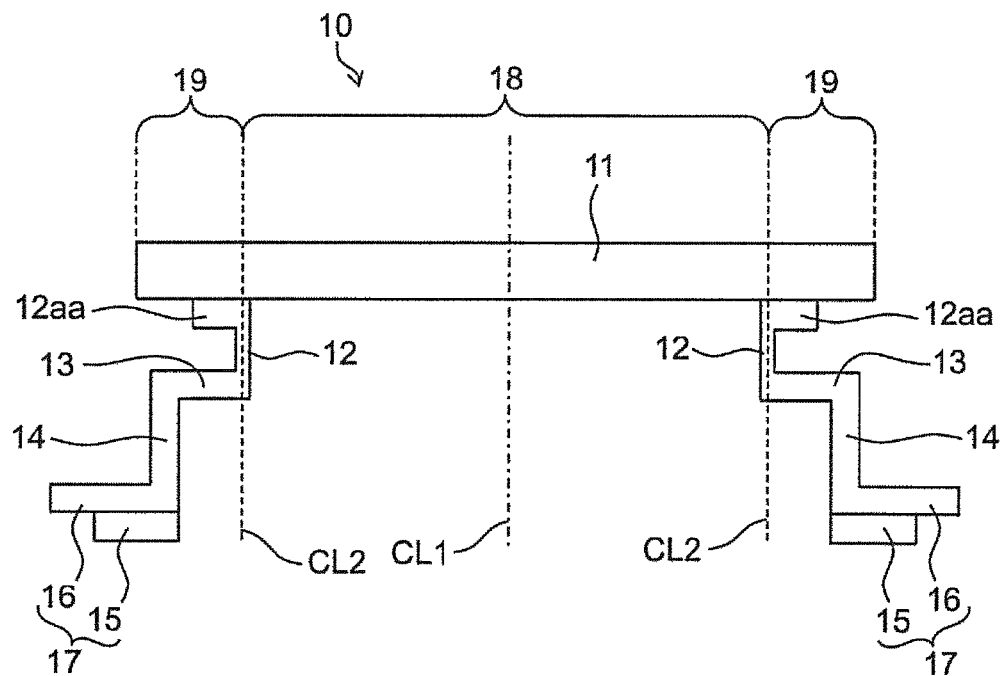
FIG. 2A is a schematic diagram illustrating an example of a configuration of the vibration device according to Preferred Embodiment 1 of the present invention.

FIG. 1 is a schematic perspective view illustrating an example of a vibration device 10 according to Preferred Embodiment 1 of the present invention. FIG. 2A is a schematic sectional view of an imaging unit 100 of FIG. 1. FIG. 2A is a schematic diagram illustrating an example of a configuration of a vibration device 10 according to Preferred Embodiment 1 of the present invention. As illustrated in FIG. 1 and FIG. 2A, the vibration device 10 includes a protective cover 11, a first cylindrical body 12, a spring portion 13, a second cylindrical body 14, and a vibrating body 17.

Protective Cover

The protective cover 11 is a light transmissive body that transmits light having a predetermined wavelength. For example, the protective cover 11 has a light-transmitting property in which an energy ray or light of a wavelength detected by an optical detecting element, such as an imaging element, for example, is transmitted. The light transmitted through the protective cover 11 is not limited to visible light or invisible light.

The protective cover 11 is supported by an end portion of the first cylindrical body 12 having a cylinder shape. Specifically, the protective cover 11 is supported by the first cylindrical body 12 at a rear surface of the protective cover 11.

The protective cover 11 includes a main body portion 18 and a protruding portion 19.

The main body portion 18 is located inside the protective cover 11. More specifically, the main body portion 18 is a portion of the protective cover 11 that is located on an inner side of a portion supported by the first cylindrical body 12.

The protruding portion 19 includes an outer circumference of the protective cover 11. Specifically, the protruding portion 19 extends from the main body portion 18 toward an outer circumference of the protective cover 11, and protrudes outward more than the portion supported by the first cylindrical body 12.

The main body portion 18 and the protruding portion 19 will be described in detail later.

As a material for the protective cover 11, for example, light transmissive plastic, glass such as quartz and borosilicate glass, light transmissive ceramic, or synthetic resin can be used. When the protective cover 11 is made of, for example, tempered glass, it is possible to increase the strength of the protective cover 11. In the case of the resin, for example, the protective cover 11 may be made of an acrylic, a cycloolefin, a polycarbonate, a polyester, or the like. Further, a coating layer made of, for example, diamond-like carbon (DLC) or the like may be provided on a surface of the protective cover 11 so as to increase the strength, and a coating layer such as, for example, a hydrophilic film, a water-repellent film, a lipophilic film, an oil repellent film, or the like may be provided to prevent contamination of the surface, remove raindrops, and the like.

The protective cover 11 has a disk shape. Specifically, the protective cover 11 is a plate-shaped member including a front surface to be an exterior and a rear surface opposite to the front surface. As viewed in a height direction of the vibration device 10, the protective cover 11 has a circular shape. Note that the shape of the protective cover 11 is not limited thereto. For example, as viewed in the height direction of the vibration device 10, the protective cover 11 may have a polygonal shape, an elliptical shape, or the like.

The protective cover 11 preferably has a disk shape with an outer diameter of equal to or more than about 10 mm and equal to or less than about 40 mm, and a thickness of equal to or more than about 0.7 mm and equal to or less than about 4 mm, for example.

First Cylindrical Body

The first cylindrical body 12 has a cylindrical shape including a first end and a second end. The first cylindrical body 12 supports the protective cover 11 at the first end. For example, the protective cover 11 and the first cylindrical body 12 are joined to each other. A method of joining the protective cover 11 and the first cylindrical body 12 is not particularly limited. The protective cover 11 and the first cylindrical body 12 may be joined to each other by an adhesive, welding, fitting, press-fitting, or the like, for example.

In Preferred Embodiment 1, the first cylindrical body 12 includes a flange 12aa at one end thereof. The flange 12aa is a plate-shaped member extending outward from the first end of the first cylindrical body 12. The flange 12aa has an annular plate shape. The first cylindrical body 12 increases a contact area with the protective cover 11 by the flange 12aa, and stably supports the protective cover 11.

The second end of the first cylindrical body 12 is supported by the spring portion 13 that elastically deforms. In other words, the first cylindrical body 12 is supported by the spring portion 13 on the side opposite to the protective cover 11 side.

The first cylindrical body 12 is a hollow member inside of which a through-hole is provided. The through-hole is provided in the height direction of the vibration device 10, and an opening of the through-hole is provided at the first and second ends of the first cylindrical body 12. The first cylindrical body 12 has, for example, a cylinder shape. As viewed in the height direction of the vibration device 10, an outer shape of the first cylindrical body 12 and the opening of the through-hole have a circular shape.

Note that the shape of the first cylindrical body 12 is not limited to a cylinder shape. For example, the shape of the first cylindrical body 12 may be a polygonal cylindrical shape, an elliptical cylinder shape, or the like.

As a material for the first cylindrical body 12, for example, a metal, a synthetic resin, or the like can be used. Further, as the material for the first cylindrical body 12, it is possible to use ceramic, glass, or the like, for example, which can be molded and/or cut.

The first cylindrical body 12 preferably has a cylinder shape having an outer diameter of equal to or more than about 8 mm and equal to or less than about 35 mm, an inner diameter of equal to or more than about 6 mm and equal to or less than about 30 mm, and a height of equal to or more than about 1 mm and equal to or less than about 10 mm, for example.

Spring Portion

The spring portion 13 is a plate spring that supports the second end of the first cylindrical body 12. The spring portion 13 extends outward from a position at which a bottom surface of the first cylindrical body 12 having a cylinder shape is supported.

Additionally, the spring portion 13 is supported by the second cylindrical body 14 at a position in an outer side portion of the position at which the first cylindrical body 12 is supported.

The spring portion 13 has a plate shape. Further, the spring portion 13 has a hollow circular shape inside of which a through-hole is provided, and extends so as to surround the circumference of the first cylindrical body 12 in a circular shape. In other words, the spring portion 13 has an annular plate shape. The annular plate shape refers to a shape in which a plate-shaped member has an annular shape. As viewed in the height direction of the vibration device 10, an outer shape of the spring portion 13 and the opening of the through-hole are a circular shape.

Note that the outer shape of the spring portion 13 and the opening of the through-hole are not limited thereto. For example, as viewed in the height direction of the vibration device 10, the shape of the spring portion 13 and the opening of the through-hole may have a polygonal shape, an elliptical shape, or the like.

As a material for the spring portion 13, for example, a metal, a synthetic resin, or the like can be used. Further, as the material for the spring portion 13, it is possible to use a ceramic, glass, or the like, for example, which can be molded and/or cut.

The spring portion 13 preferably has an annular plate shape having an outer diameter of equal to or more than about 10 mm and equal to or less than about 40 mm, an inner diameter of equal to or more than about 6 mm and equal to or less than about 30 mm, and a thickness of equal to or more than about 0.2 mm and equal to or less than about 5 mm, for example.

In Preferred Embodiment 1, a thickness of the first cylindrical body 12 is the same as or thinner than a thickness of the spring portion 13 or the second cylindrical body 14. The thickness of the first cylindrical body 12 is shorter than a length from the position of the spring portion 13 that supports the first cylindrical body 12 to the position of the spring portion 13 that is supported by the second cylindrical body 14.

Second Cylindrical Body

The second cylindrical body 14 has a cylindrical shape including a first end and a second end. The second cylindrical body 14 supports, at the first end, a position of the spring portion 13 in an outer side portion of the position at which the first cylindrical body 12 is supported.

The vibrating body 17 is located at the second end of the second cylindrical body 14.

The second cylindrical body 14 is a hollow member inside of which a through-hole is provided. The through-hole is provided in the height direction of the vibration device 10, and an opening of the through-hole is provided at the first and second ends of the second cylindrical body 14. The second cylindrical body 14 has, for example, a cylinder shape. As viewed in the height direction of the vibration device 10, an outer shape of the second cylindrical body 14 and the opening of the through-hole are circular.

Note that the shape of the second cylindrical body 14 is not limited to a cylinder shape. For example, the shape of the first cylindrical body 12 may be a polygonal cylindrical shape, an elliptical cylinder shape, or the like.

As a material for the second cylindrical body 14, for example, a metal, a synthetic resin, or the like can be used. Further, as the material for forming the second cylindrical body 14, it is possible to use ceramic, glass, or the like, for example, which can be molded and/or cut.

The second cylindrical body 14 preferably has a cylinder shape having an outer diameter of equal to or more than about 12 mm and equal to or less than about 42 mm, an inner diameter of equal to or more than about 10 mm and equal to or less than about 40 mm, and a height of equal to or more than about 2 mm and equal to or less than about 15 mm, for example.

Vibrating Body

The vibrating body 17 is provided on the second end side of the second cylindrical body 14, and vibrates in a penetrating direction of the second cylindrical body 14. The penetrating direction refers to the height direction of the vibration device 10. Specifically, the vibrating body 17 is provided on the second end of the second cylindrical body 14, i.e., on a bottom surface of the second cylindrical body 14.

The vibrating body 17 includes a piezoelectric element 15 and a vibration plate 16.

The piezoelectric element 15 is provided on a bottom surface (lower surface) of the vibration plate 16. The piezoelectric element 15 vibrates the second cylindrical body 14 in the penetrating direction by vibrating the vibration plate 16. For example, the piezoelectric element 15 vibrates by a voltage being applied thereto.

The piezoelectric element 15 has a hollow circular shape inside of which a through-hole is provided. In other words, the piezoelectric element 15 has an annular plate shape. As viewed in the height direction of the vibration device 10, an outer shape of the piezoelectric element 15 and the opening of the through-hole are circular.

Note that the outer shape of the piezoelectric element 15 and the opening of the through-hole are not limited thereto. For example, as viewed in the height direction of the vibration device 10, the outer shape of the piezoelectric element 15 and the opening of the through-hole may have a polygonal shape, an elliptical shape, or the like.

The piezoelectric element 15 includes a piezoelectric body and an electrode. As a material for the piezoelectric body, for example, an appropriate piezoelectric ceramic such as barium titanate ($BaTiO_3$), lead zirconate titanate (PZT: $PbTiO_3$ $PbZrO_3$), lead titanate ($PbTiO_3$), lead metaniobate ($PbNb_2O_6$), bismuth titanate ($Bi_4Ti_3O_{12}$), and (K, Na) $NbO_3$, an appropriate piezoelectric single crystal such as $LiTaO_3$ or $LiNbO_3$ can be used. The electrode may preferably be, for example, an Ni electrode. The electrode may be made of a metal thin film such as Ag or Au, for example, which is formed by a sputtering method. Alternatively, the electrode can be formed by, for example, plating, vapor deposition, or the like, in addition to sputtering.

The piezoelectric element 15 preferably has an annular plate shape having an outer diameter of equal to or more than about 10 mm and equal to or less than about 40 mm, an inner diameter of equal to or more than about 8 mm and equal to or less than about 30 mm, and a thickness of equal to or more than about 0.1 mm and equal to or less than about 3 mm, for example.

The vibration plate 16 is a plate shaped member extending outward from the second end of the second cylindrical body 14. The vibration plate 16 extends outward from a position at which a bottom surface of the second cylindrical body 14 is supported.

The vibration plate 16 has a hollow circular shape inside of which a through-hole is provided, and extends so as to surround the circumference of the second cylindrical body 14 in a circular shape. In other words, the vibration plate 16 has an annular plate shape.

As a material for the vibration plate 16, for example, a metal, a synthetic resin, or the like may be used. Further, as the material for the vibration plate 16, it is possible to use a ceramic, glass, or the like, for example, which can be molded and/or cut.

The vibration plate 16 preferably has an annular plate shape having an outer diameter of equal to or more than about 10 mm and equal to or less than about 50 mm, an inner diameter of equal to or more than about 8 mm and equal to or less than about 30 mm, and a thickness of equal to or more than about 0.2 mm and equal to or less than about 4 mm, for example.

The protective cover 11, the first cylindrical body 12, the spring portion 13, and the second cylindrical body 14 are configured such that a resonant frequency of the protective cover 11 is larger than a resonant frequency of the spring portion 13. Specifically, the resonant frequency of the protective cover 11 is larger than the resonant frequency of the spring portion 13 by determining the materials and the dimensions of the protective cover 11, the first cylindrical body 12, the spring portion 13, and the second cylindrical body 14 described above.

The first cylindrical body 12, the spring portion 13, the second cylindrical body 14, and the vibration plate 16 are integrally provided. Note that the first cylindrical body 12, the spring portion 13, the second cylindrical body 14, and the vibration plate 16 may be separate elements or may be separate members.

In a configuration in which the resonant frequency of the protective cover 11 is larger than the resonant frequency of the spring portion 13, the protective cover 11 is supported by the first cylindrical body 12, and thus, a vibration in which the central portion is moved up and down with a support portion as a fixed end appears. This vibration mode is referred to as a flexural resonance of the protective cover 11 and is determined by a diameter thickness and/or a Young's modulus density of the main body portion of the protective cover 11.

Figure 2B:
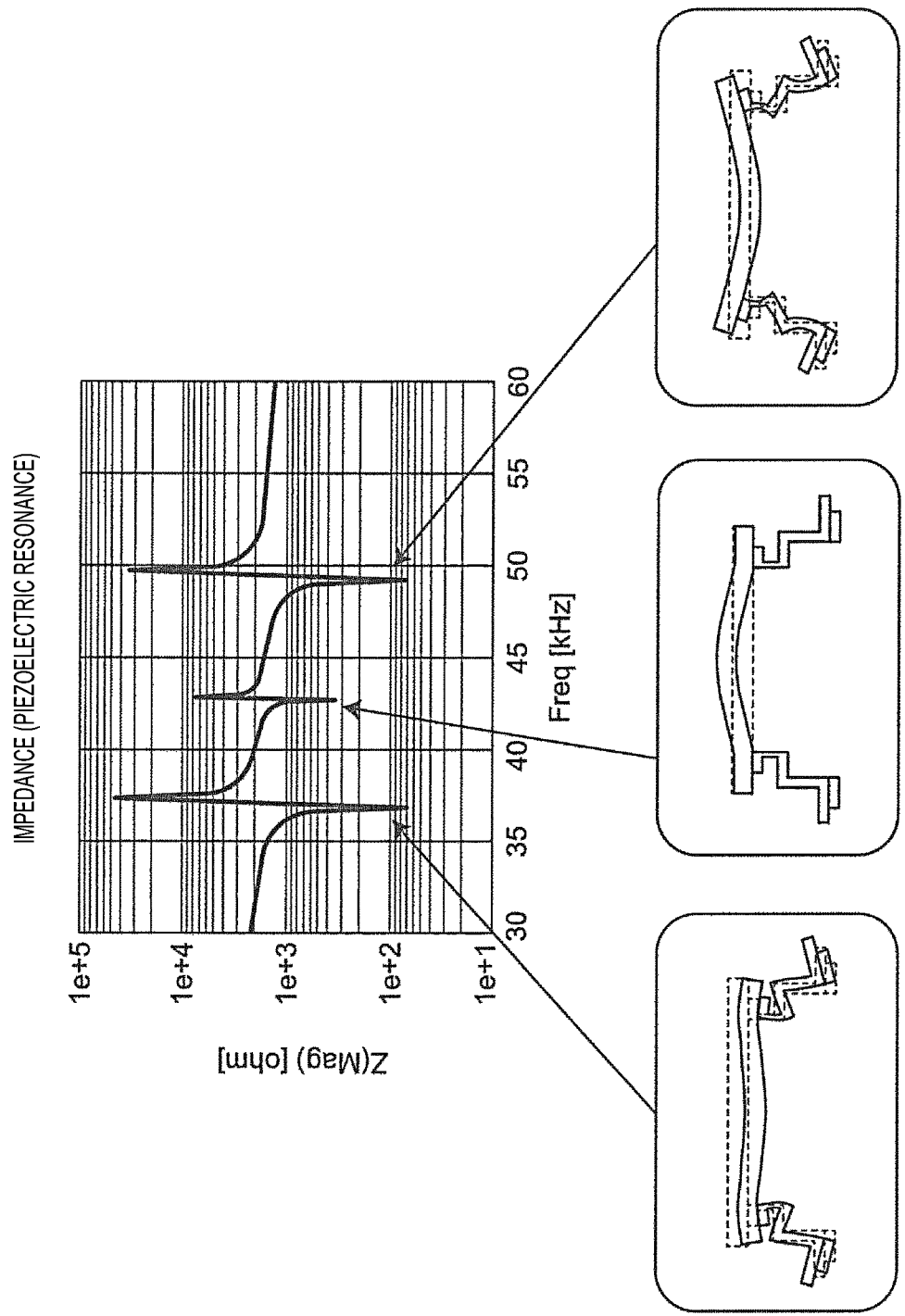
FIG. 2B is a diagram illustrating a relationship between a frequency and an impedance of a drive signal to be applied to a piezoelectric element in the vibration device according to Preferred Embodiment 1 of the present invention.

FIG. 2B is a diagram illustrating a relationship between a frequency and an impedance of the drive signal to be applied to the piezoelectric element 15 in the vibration device 10 according to Preferred Embodiment 1 of the present invention. As illustrated in FIG. 2B, for example, in a case where the glass has a diameter of about 18.5 mm and a thickness of about 2 mm, the flexural resonance of the protective cover 11 appears near 43 kHz. On the other hand, in the vibration of the spring portion 13, a piston-like vertical vibration is performed by placing an object of the first cylindrical body 12 and the protective cover 11 coupled to each other on the end portion as a weight. This resonance is a cantilever-shaped vibration in which a coupling portion with the second cylindrical body 14 serves as a fixed end, and appears near 36 kHz when, for example, a stainless steel having a projection amount of about 2.5 mm and a thickness of about 1 mm is used.

The vibration device 10 is configured such that the resonant frequency of the protective cover 11 is larger than the resonant frequency of the spring portion 13, and a protruding portion 19 is provided in the protective cover 11. In the vibration device 10, the displacement of the protective cover 11 can be changed by the protruding portion 19. For example, when a protrusion amount (weight) of the protruding portion 19 is changed, the flexural resonance is less changed, and the vertical vibration on the piston is changed (decreased). Specifically, in a case where a weight ratio between the main body portion 18 of the protective cover 11 and the protruding portion 19 is within a predetermined range, a vibration is generated to cancel the displacement of the central portion of the protective cover 11 by the protruding portion 19. As a result, the displacement amount of a peripheral portion becomes larger than that of the central portion of the protective cover 11.

As described above, in the configuration of the vibration device 10, in which the resonant frequency of the protective cover 11 is larger than the resonant frequency of the spring portion 13, the displacement amount of the peripheral portion is larger than that of the central portion of the protective cover 11 by optimizing the weight ratio between the protruding portion 19 and the main body portion 18.

Next, the main body portion 18 and the protruding portion 19 of the protective cover 11 will be described in detail.

Figure 3:
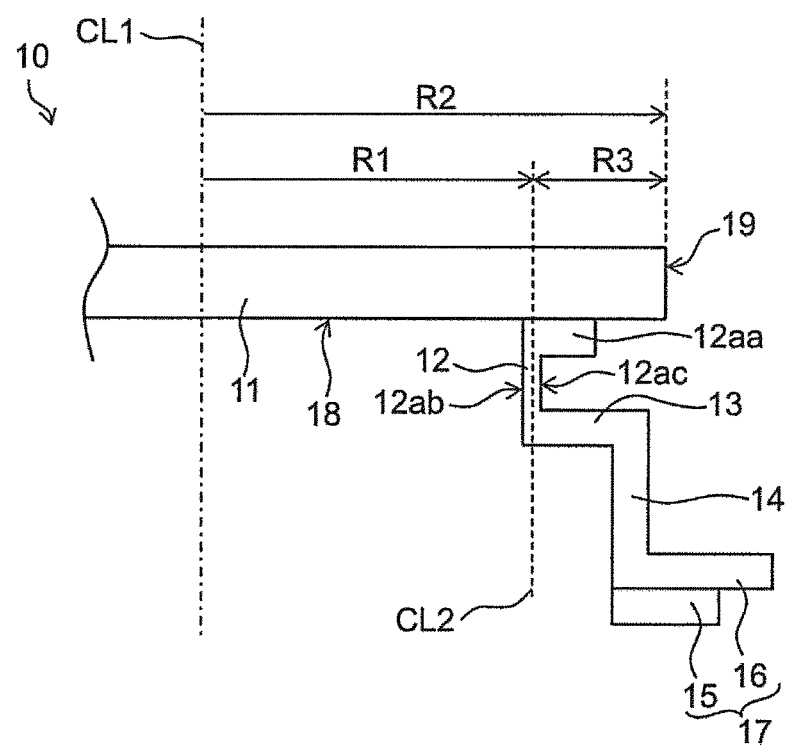
FIG. 3 is an enlarged schematic view of the vibration device of FIG. 2A.
Figure 4:
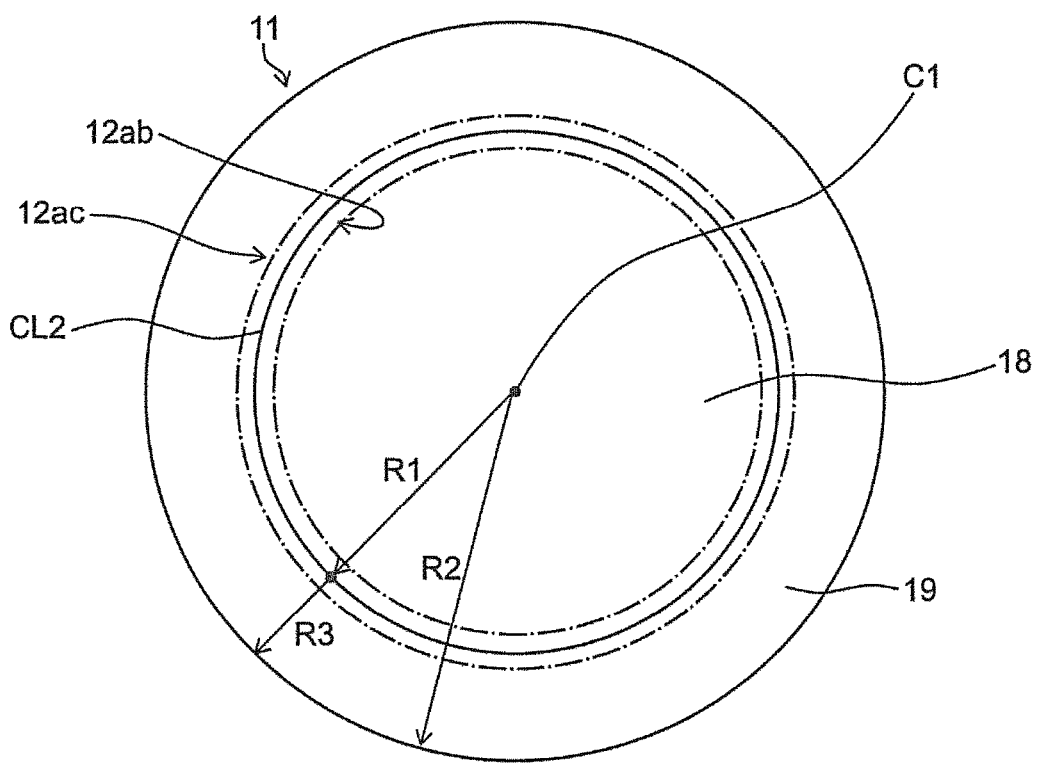
FIG. 4 is a schematic plan view of the vibration device of FIG. 2A.

FIG. 3 is an enlarged schematic view illustrating the vibration device 10 of FIG. 2A. FIG. 4 is a schematic plan view of the vibration device 10 of FIG. 2A. A symbol "Cl" in the drawing indicates the center of the protective cover 11 in a plan view of the protective cover 11. A symbol "CL1" in the drawing indicates a center line passing through the center Cl in a side sectional view of the protective cover 11. A symbol "CL2" in the drawing indicates a border line between the main body portion 18 and the protruding portion 19.

Main Body Portion

As illustrated in FIG. 3 and FIG. 4, the main body portion 18 is located on an inner side of the portion supported by the first cylindrical body 12. The main body portion 18 is a portion including the central portion of the protective cover 11.

The main body portion 18 has a disk shape with a radius R1 centered on the center Cl of the protective cover 11. The main body portion 18 has a circular shape with the radius R1 in a plan view of the protective cover 11. The radius R1 is determined by a distance from the center Cl of the protective cover 11 to the portion supported by the first cylindrical body 12. The portion supported by the first cylindrical body 12 is a portion defining and functioning as a fulcrum to support the protective cover 11 by the first cylindrical body 12.

Specifically, the "portion supported by the first cylindrical body 12" refers to a portion through which the border line CL2 illustrated in FIG. 3 and FIG. 4 passes. For example, the border line CL2 is provided between an inner wall 12*ab* and an outer wall 12*ac* of the first cylindrical body 12. The border line CL2 is provided at a distance equal or substantially equal to each other from the inner wall 12*ab* and the outer wall 12*ac* of the first cylindrical body 12. In the example illustrated in FIG. 4, in a plan view of the protective cover 11, the circular border line CL2 is provided between the circular inner wall 12*ab* and the circular outer wall 12*bc*.

Note that the shape of the main body portion 18 is not limited to a circular shape in a plan view of the protective cover 11. The shape of the main body portion 18 is changed depending on the configuration supported by the first cylindrical body 12. For example, in a plan view of the protective cover 11, the shape of the main body portion 18 may be a polygonal shape, an elliptical shape, or the like.

The protruding portion 19 extends from the main body portion 18 toward the outer circumference of the protective cover 11, and protrudes outward more than the portion supported by the first cylindrical body 12. The protruding portion 19 includes a peripheral portion of the protective cover 11.

The protruding portion 19 has an annular shape with the inner radius R1 and an outer radius R2 centered on the center Cl of the protective cover 11. The inner radius R1 is a half of an inner diameter of the protruding portion 19. The outer radius R2 is a half of an outer diameter of the protruding portion 19.

As described above, the inner radius R1 is determined by the distance from the center Cl of the protective cover 11 to the portion supported by the first cylindrical body 12. The outer radius R2 is determined by a protrusion amount R3 from the main body portion 18. That is, the outer radius R2 is determined by the addition of the inner radius R1 and the protrusion amount R3.

Note that the shape of the protruding portion 19 is not limited to an annular shape in a plan view of the protective cover 11. For example, in a plan view of the protective cover 11, the protruding portion 19 may have a polygonal shape, an elliptical shape, or the like. The shape of the protruding portion 19 may be an irregular shape.

Imaging Unit

An example of an imaging unit including the vibration device 10 will be described.

Figure 5:
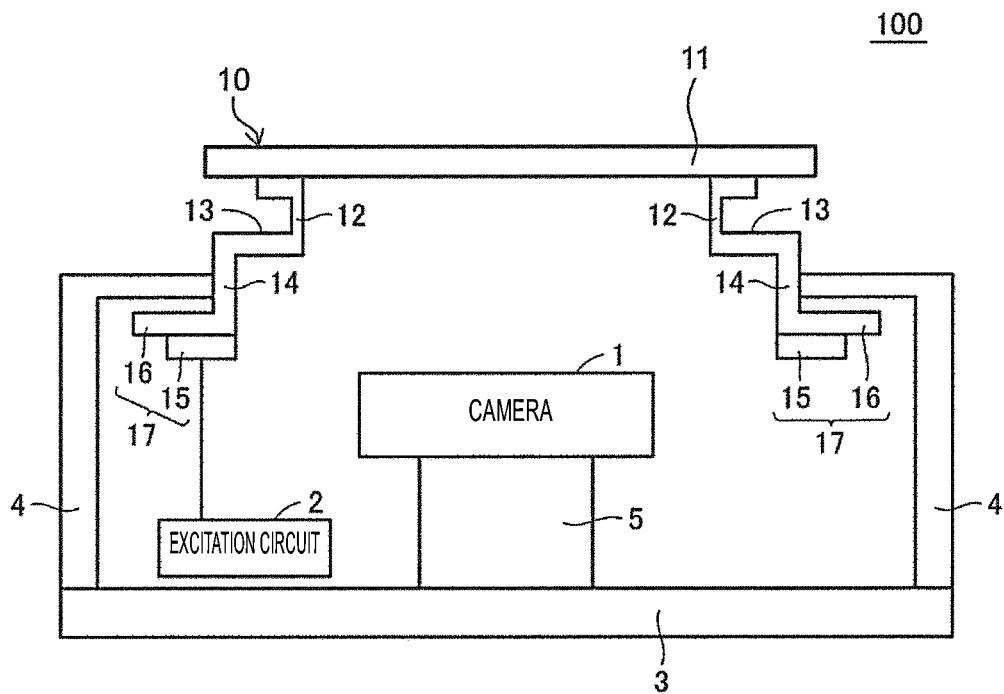
FIG. 5 is a schematic diagram illustrating an example of a configuration of an imaging unit including the vibration device of FIG. 1.

FIG. 5 is a schematic diagram illustrating an example of a configuration of the imaging unit 100 including the vibration device 10 of FIG. 1. The imaging unit 100 illustrated in FIG. 5 is mounted on, for example, a front side, a rear side, and the like of a vehicle, and captures an image of an object to be imaged. Note that a place where the imaging unit 100 is attached is not limited to the vehicle, and may be attached to another device such as a ship, an airplane, or the like, for example.

As illustrated in FIG. 5, the imaging unit 100 includes the vibration device 10 and a camera 1 as an imaging element housed in the vibration device 10. Examples of the imaging element include a CMOS, a CCD, a bolometer, and a thermopile that receive light having a wavelength in a range from a visible region to a far-infrared region. The camera 1 is fixed to an upper end portion of a main body member 5 fixed to a base member 3. The vibration device 10 is supported by a support member 4 fixed to the base member 3.

In a case where the imaging unit 100 is mounted on a vehicle or the like to be used outdoors, foreign matter such as raindrops, mud, and dust, for example, may adhere to the protective cover 11 that is arranged in a visual field direction of the camera 1 and covers the outside thereof. The vibration device 10 can generate a vibration to remove foreign matter, such as raindrops, for example, adhering to the protective cover 11.

The vibration device 10 includes an excitation circuit that applies a drive signal to generate a vibration to the piezoelectric element 15. The excitation circuit 2 is connected to the piezoelectric element 15 via, for example, a power supply conductor. The piezoelectric element 15 vibrates in the penetrating direction of the second cylindrical body 14 based on the drive signal from the excitation circuit 2. The vibration of the piezoelectric element 15 causes the vibration plate 16 to vibrate in the penetrating direction of the second cylindrical body 14, and the vibration plate 16 causes the second cylindrical body 14 to vibrate in the penetrating direction of the second cylindrical body 14. The vibration of the second cylindrical body 14 makes it possible to transmit the vibration of the piezoelectric element 15 to the first cylindrical body 12 via the spring portion 13. In the vibration device 10, vibrating the first cylindrical body 12 causes the protective cover 11 to vibrate, and foreign matter such as, for example, raindrops adhering to the protective cover 11 is removed.

The excitation circuit 2 applies a drive signal to the piezoelectric element 15 such that the first cylindrical body 12 and the second cylindrical body 14 vibrate in the penetrating direction of the second cylindrical body 14 in the opposite phase. The excitation circuit 2 can vibrate the vibration device 10 in a vibration mode other than that the first cylindrical body 12 and the second cylindrical body 14 vibrate in the penetrating direction of the second cylindrical body 14 in the opposite phase by the drive signal applied to the piezoelectric element 15.

Operation

An example of an operation of the vibration device 10 will be described in detail below.

Figure 6:
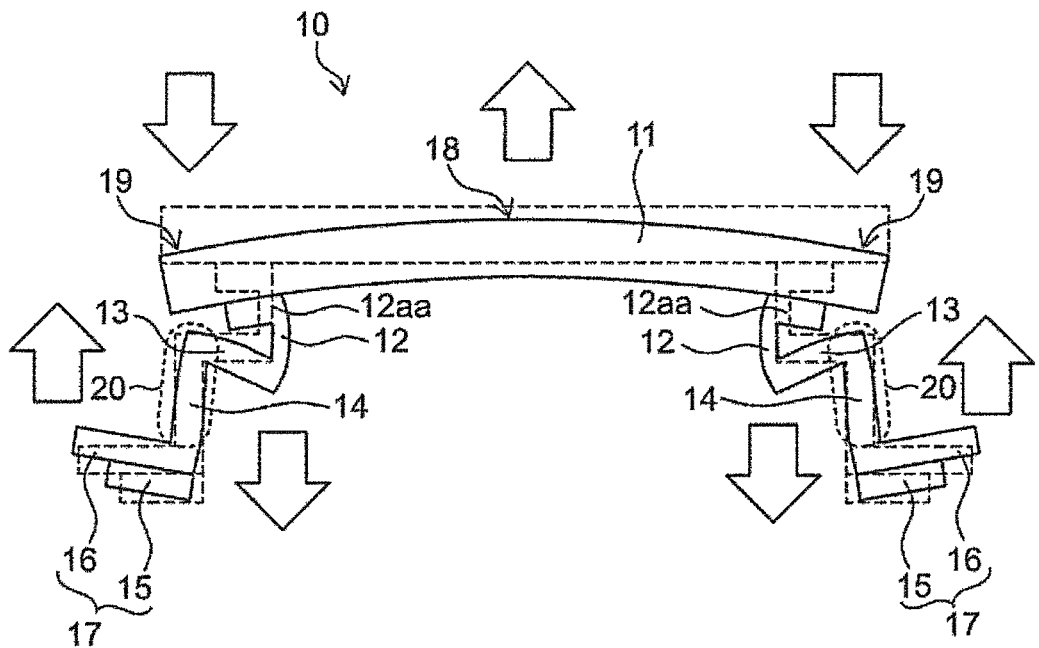
FIG. 6 is a schematic diagram illustrating an example of an operation of the vibration device of FIG. 1.

FIG. 6 is a schematic diagram illustrating an example of the operation of the vibration device 10 of FIG. 1. FIG. 6 illustrates an example of the vibration of the vibration device 10 of Preferred Embodiment 1. In FIG. 6, a reference position of the vibration device 10 before the start of the vibration is indicated by a broken line, and a position of the vibration device 10 after the displacement is indicated by a solid line.

As illustrated in FIG. 6, the piezoelectric element 15 vibrates in the penetrating direction of the second cylindrical body 14 based on the drive signal from the excitation circuit 2 (see FIG. 5). As such, when the vibration plate 16 is displaced upward, the second cylindrical body 14 is also displaced upward, and the position of the spring portion 13 at which the first cylindrical body 12 is supported sinks downward. The position of the spring portion 13 at which the first cylindrical body 12 is supported sinks downward, so that the first cylindrical body 12 is displaced downward. As a result, the protruding portion 19 of the protective cover 11 supported by the first cylindrical body 12 is displaced downward. That is, the peripheral portion of the protective cover 11 is displaced downward. On the other hand, in the main body portion 18 located on an inner side of the portion supported by the first cylindrical body 12, the central portion of the protective cover 11 is displaced upward in a displacement amount smaller than that of the peripheral portion. Alternatively, the central portion of the protective cover 11 is not displaced. At this time, a node (a portion not displaced even by the vibration of the piezoelectric element 15) 20 is formed on a side surface of the second cylindrical body 14.

Although not illustrated, since the piezoelectric element 15 vibrates in the penetrating direction of the second cylindrical body 14 based on the drive signal from the excitation circuit 2 (see FIG. 5), when the vibration plate 16 is displaced downward, the second cylindrical body 14 is also displaced downward. As such, the position of the spring portion 13 at which the first cylindrical body 12 is supported rises upward. The position of the spring portion 13 at which the first cylindrical body 12 is supported rises upward, so that the first cylindrical body 12 is displaced upward. As a result, the protruding portion 19 of the protective cover 11 supported by the first cylindrical body 12 is displaced upward. That is, the peripheral portion of the protective cover 11 is displaced upward. On the other hand, in the main body portion 18 located on the inner side of the portion supported by the first cylindrical body 12, the central portion of the protective cover 11 is displaced downward in a displacement amount smaller than that of the peripheral portion. Alternatively, the central portion of the protective cover 11 is not displaced. At this time, the node 20 is formed on the side surface of the second cylindrical body 14.

As described above, in the vibration device 10, the protective cover 11 is displaced in an up-down direction such that the displacement amount of the peripheral portion is larger than that of the central portion due to the vibration of the piezoelectric element 15. By such an operation, in the vibration device 10, liquid droplets adhering to the surface of the protective cover 11 can be moved from the central portion of the protective cover 11 to the peripheral portion. Accordingly, in the vibration device 10, the liquid droplets can be atomized and removed in the peripheral portion of the protective cover 11.

Figure 7:
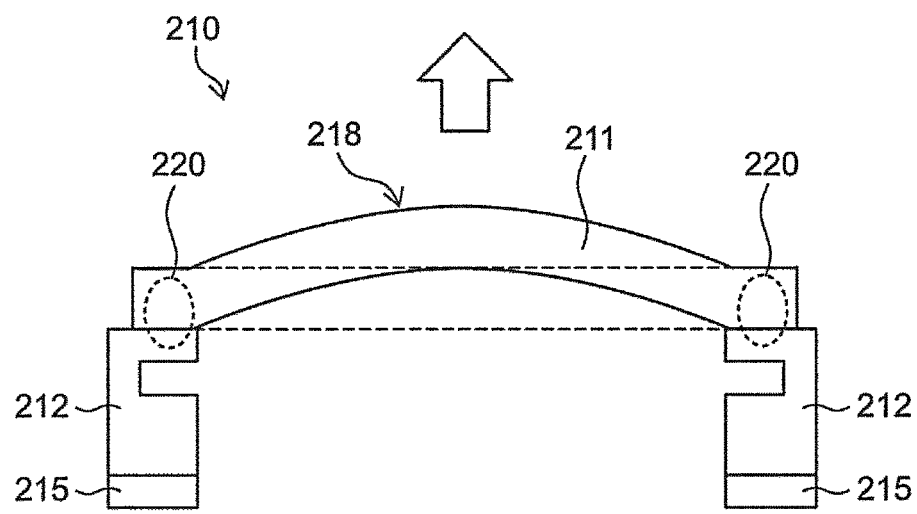
FIG. 7 is a schematic diagram illustrating an example of an operation of a vibration device of Comparative Example 1.

A vibration of a vibration device 210 of Comparative Example 1 will be described as a comparison target. FIG. 7 is a schematic diagram illustrating an example of an operation of the vibration device 210 of Comparative Example 1. In FIG. 7, a reference position of the vibration device 210 before the start of the vibration is indicated by a broken line, and a position of the vibration device 210 after the displacement is indicated by a solid line.

As illustrated in FIG. 7, the vibration device 210 of Comparative Example 1 vibrates such that the protective cover 11 is displaced most in the up-down direction in the central portion and is not displaced in the peripheral portion due to the vibration of the piezoelectric element 15.

The vibration device 210 includes a protective cover 211, a cylindrical body 212, and a piezoelectric element 115. The protective cover 211 has a disk shape. The protective cover 211 is held at an end portion of the cylindrical body 212 having a cylinder shape. The cylindrical body 212 has a structure in which a partially recessed portion is provided on an inner surface close to an end portion at which a piezoelectric element 215 is provided.

The vibration device 210 of Comparative Example 1 is different from the vibration device 10 of Preferred Embodiment 1 in that the spring portion 13, the second cylindrical body 14, and the vibration plate 16 are not provided, and in that the protective cover 211 is not provided with the protruding portion 19.

In the vibration device 210, the piezoelectric element 215 vibrates in the penetrating direction of the cylindrical body 212 based on the drive signal from the excitation circuit, such that the vibration is transmitted to the protective cover 211 via the cylindrical body 212, so that the protective cover 211 vibrates such that a central portion thereof is most displaced in the upward direction. At this time, a node 220 is provided in a peripheral portion of the protective cover 211. As illustrated in FIG. 7, in the vibration device 210, due to the vibration of the piezoelectric element 215, the protective cover 211 vibrates such that the central portion is most displaced in the up-down direction and the peripheral portion is not displaced. By such an operation, in the vibration device 210, the liquid droplets adhering to the surface of the protective cover 211 are moved from the peripheral portion of the protective cover 11 to the center.

Structure of Protruding Portion

A structure of the protruding portion 19 will be described in detail below.

Evaluations for examining changes in the displacement amount in the protective cover 11 in a case where the outer radius R2 of the protruding portion 19 was changed were performed by using Examples 1 to 3 of preferred embodiments of the present invention. Examples 1 to 3 have the same or substantially the same configuration as the vibration device 10 of Preferred Embodiment 1 described above except that the outer radius R2 of the protruding portion 19 is changed.

The vibration device 10 used in each of Examples 1 to 3 will be described.

In Example 1, the protective cover 11 has a disk shape having an outer diameter of about 22 mm and a thickness of about 2 mm. The first cylindrical body 12 has a cylinder shape having an outer diameter of about 19 mm, an inner diameter of about 18 mm, and a height of about 2.5 mm. The spring portion 13 has an annular plate shape having an outer diameter of about 25 mm, an inner diameter of about 18 mm, and a thickness of about 1 mm. The second cylindrical body 14 has a cylinder shape having an outer diameter of about 25 mm, an inner diameter of about 23 mm, and a height of about 2.5 mm. The piezoelectric element 15 has an annular plate shape having an outer diameter of about 29 mm, an inner diameter of about 23 mm, and a thickness of about 1 mm. The vibration plate 16 has an annular plate shape having an outer diameter of about 32 mm, an inner diameter of about 23 mm, and a thickness of about 1.5 mm. Further, a material for the protective cover 11 is a light transmissive glass. A material for the first cylindrical body 12 is stainless steel. A material for the spring portion 13 is stainless steel. A material for the second cylindrical body 14 is stainless steel. A material for the piezoelectric element 15 is a PZT (lead zirconate titanate) ceramic. A material for the vibration plate 16 is stainless steel.

Example 2 is the same as Example 1 except that the outer diameter of the protective cover 11 is about 26 mm.

Example 3 is the same as Example 1 except that the outer diameter of the protective cover 11 is about 30 mm.

Note that, in Example 1, the radius R1 that defines and functions as the border line CL2 between the main body portion 18 and the protruding portion 19 in the protective cover 11 is about 9.25 mm, the outer radius R2 of the protruding portion 19 is about 11 mm, and the protrusion amount R3 is about 1.75 mm. In Example 2, the radius R1 is about 9.25 mm, the radius R2 is about 13 mm, and the protrusion amount R3 is about 3.75 mm. In Example 3, the radius R1 is about 9.25 mm, the radius R2 is about 15 mm, and the protrusion amount R3 is about 5.75 mm.

Figure 8A:
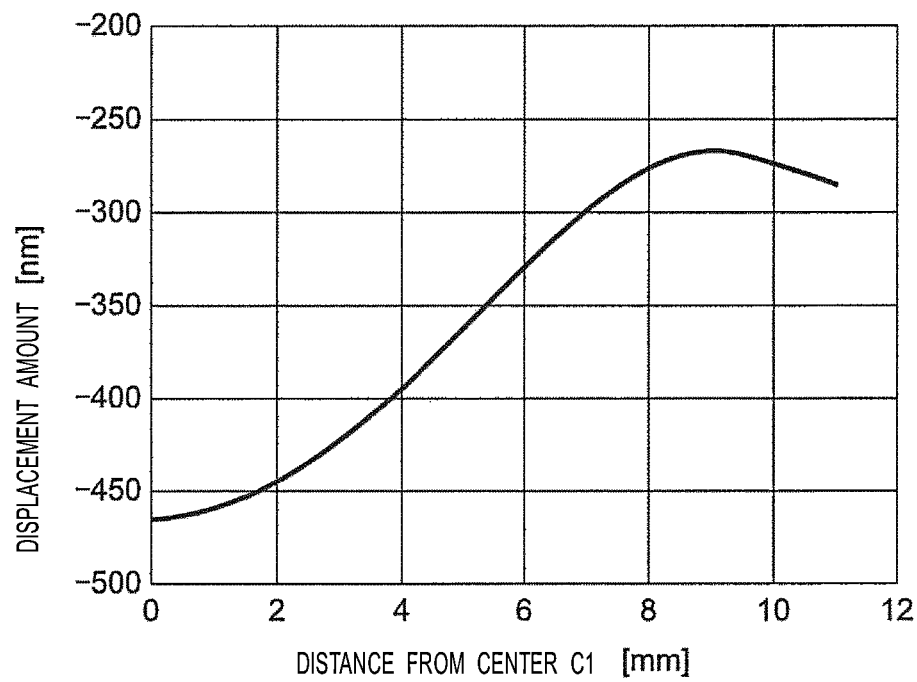
FIG. 8A is a graph showing a change in a displacement amount with respect to a change in a distance from the center of a protective cover in Example 1 of a preferred embodiment of the present invention.
Figure 8B:
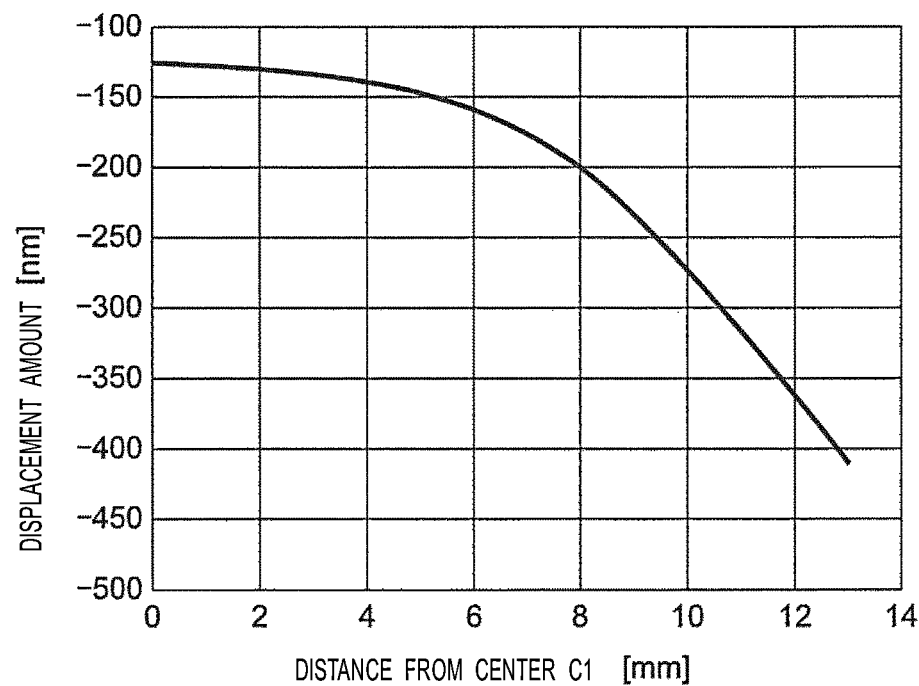
FIG. 8B is a graph showing a change in a displacement amount with respect to a change in a distance from the center of a protective cover in Example 2 of a preferred embodiment of the present invention.
Figure 8C:
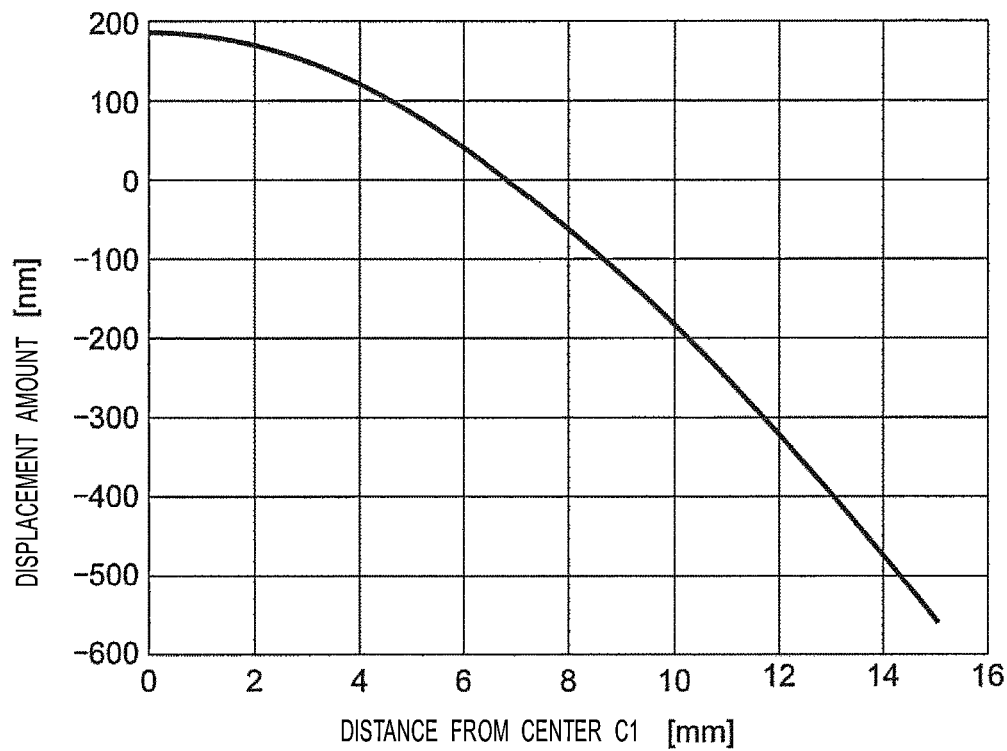
FIG. 8C is a graph showing a change in a displacement amount with respect to a change in a distance from the center of a protective cover in Example 3 of a preferred embodiment of the present invention.
Figure 9:
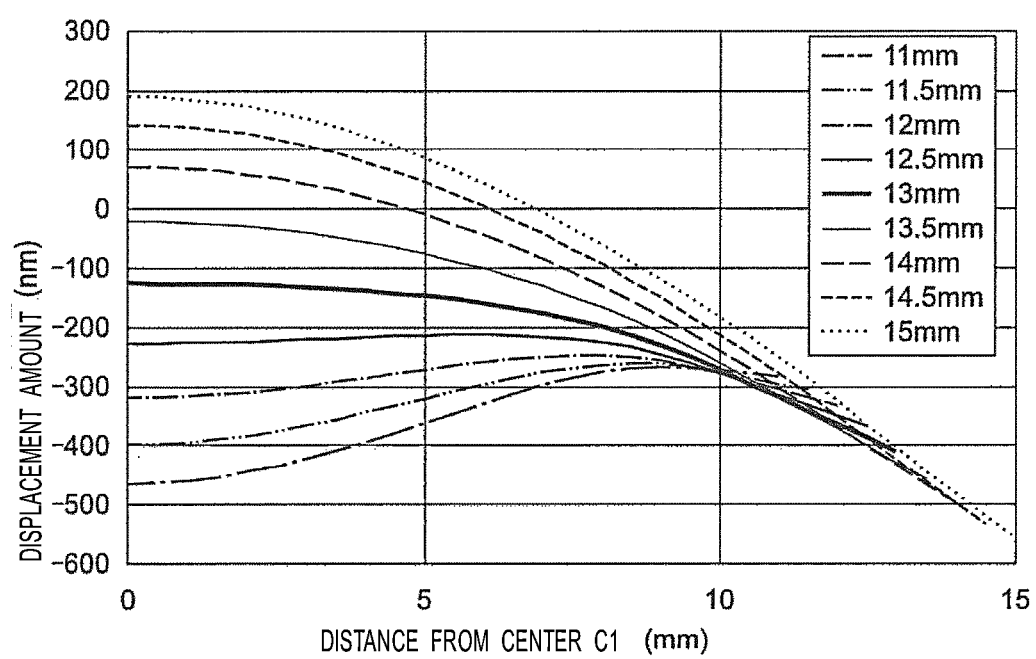
FIG. 9 is a graph showing an example of a relationship between a distance from the center of a protective cover and a displacement amount in a case where an outer radius of a protruding portion is changed.
Figure 10:
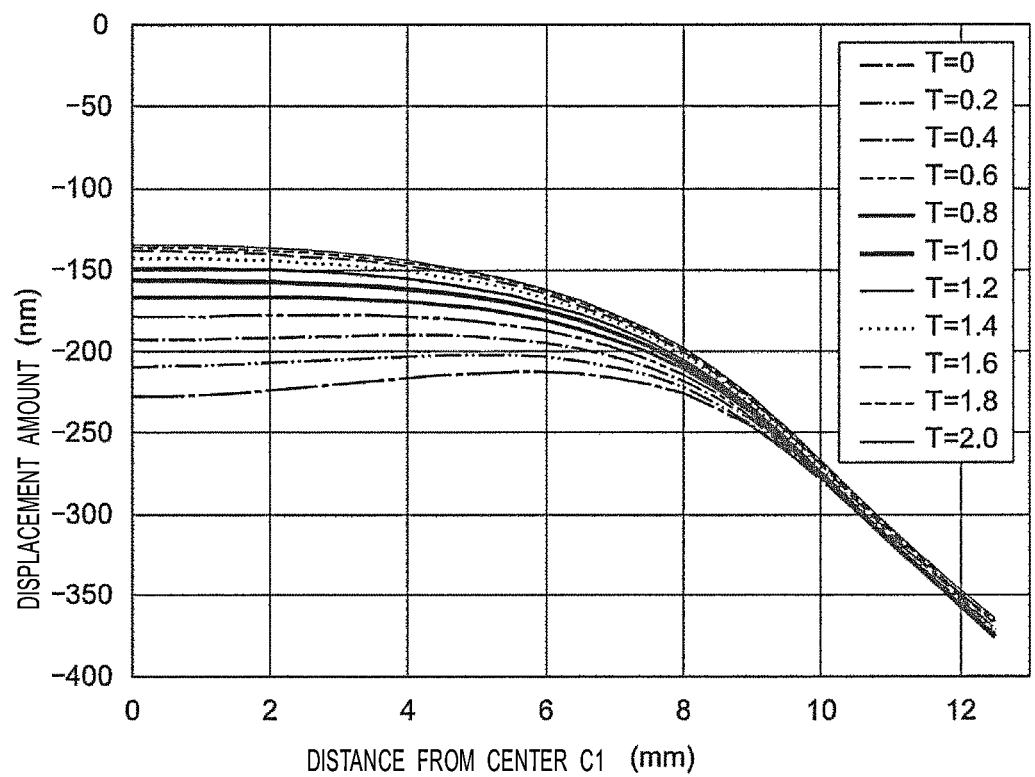
FIG. 10 is a graph showing an example of a relationship between a distance from the center of the protective cover and a displacement amount in a case where a thickness of a weight attached to the protruding portion is changed.

FIGS. 8A to 8C each are graphs showing changes in the displacement amount with respect to the distance from the center Cl of the protective cover 11 in Examples 1 to 3. In the graphs shown in FIGS. 8A to 8C, the displacement amount in the vicinity of the distance of about 0 mm from the center Cl indicates the displacement amount of the central portion of the protective cover 11. Further, the displacement amount of a region having a distance larger than about 9.25 mm from the center Cl indicates the displacement amount of the peripheral portion of the protective cover 11.

As shown in FIG. 8A, in Example 1, the displacement amount of the central portion of the protective cover 11 exceeds about −450 nm. On the other hand, the displacement amount of the peripheral portion of the protective cover 11 is about −270 nm. In Example 1, the displacement amount of the central portion is larger than that of the peripheral portion of the protective cover 11.

In Example 1, the peripheral portion of the protective cover 11 moves while having no or substantially no influence on the central portion. Note that when the radius R2 of the protective cover 11 is further reduced from about 11 mm, the displacement in the central portion becomes smaller to be close to a flat shape. When the liquid droplets are placed on the surface of the protective cover 11 in this state, the displacement of the central portion is larger than that of the peripheral portion, and therefore, the liquid droplets move toward the central portion. Therefore, in Example 1, the liquid droplets are atomized in the central portion of the protective cover 11.

As shown in FIG. 8B, in Example 2, the displacement amount of the central portion of the protective cover 11 is about −130 nm. On the other hand, the displacement amount of the peripheral portion of the protective cover 11 is about −400 nm. In Example 2, the displacement amount of the peripheral portion of the protective cover 11 is larger than that of the central portion. When the liquid droplets are placed on the surface of the protective cover 11 in this state, the displacement of the peripheral portion is larger than that of the central portion, and therefore, the liquid droplets move toward the peripheral portion. Therefore, in Example 2, the liquid droplets can be atomized in the peripheral portion of the protective cover 11.

As shown in FIG. 8C, in Example 3, the displacement amount of the central portion of the protective cover 11 exceeds about −190 nm. On the other hand, the displacement amount of the peripheral portion of the protective cover 11 is about −270 nm. In Example 3, the displacement amount of the central portion is larger than that of the peripheral portion of the protective cover 11.

In Example 3, the displacement of the peripheral portion of the protective cover 11 also increases, but the displacement of the central portion also increases. Further, the sign of displacement changes between the central portion and the peripheral portion of the protective cover 11. Therefore, a portion having a displacement amount of "0" is present on the surface of the protective cover 11. In FIG. 8C, the portion having a displacement amount of "0" is present in the vicinity of about 6.75 mm in the distance from the center Cl. In a plan view of the protective cover 11, the portion having a displacement amount of "0" is formed in an annular shape having a radius of about 6.75 mm. In this portion, an event in which liquid droplets and foreign matter remain is likely to occur.

Further, an evaluation for examining in detail the change in the displacement amount in the protective cover 11 in a case where the outer radius R2 of the protruding portion 19 was changed for each about 0.5 mm within a range of equal to or more than about 11 mm and equal to or less than about 15 mm was performed. FIG. 9 is a graph showing an example of a relationship between the distance from the center Cl of the protective cover 11 and the displacement amount in a case where the outer radius R2 of the protruding portion 19 is changed. Note that also in the evaluation shown in FIG. 9, the evaluation was performed using a vibration device having the same or substantially the same configuration as that of the vibration device 10 of Preferred Embodiment 1, except that the outer radius R2 of the protruding portion 19 is changed.

As shown in FIG. 9, in a range in which the outer radius R2 of the protruding portion 19 is equal to or more than about 12.5 mm and equal to or less than about 13.5 mm, the displacement amount of the peripheral portion is larger than that of the central portion of the protective cover 11. Note that, in the range in which the outer radius R2 of the protruding portion 19 is equal to or more than about 12.5 mm and equal to or less than about 13.5 mm, the protrusion amount R3 is within a range of equal to or more than about 3.25 mm and equal to or less than about 4.25 mm.

Here, the displacement of the protective cover 11 seems to depend on the outer radius R2 of the protruding portion 19, that is, to depend on the protrusion amount R3 of the protruding portion 19, but actually depends on a ratio between the weight of the protruding portion 19 and the weight of the main body portion 18.

Therefore, by using a vibration device 10E (see FIG. 21A described later) in which a weight 21 was attached to a lower surface of the protruding portion 19, the relationship between the distance from the center Cl and the displacement amount of the protective cover 11 in a case where the weight 21 was changed was examined. FIG. 10 is a graph showing an example of the relationship between the distance from the center Cl of the protective cover 11 and the displacement amount when a thickness T of the weight 21 attached to the protruding portion 19 is changed. In the evaluation shown in FIG. 10, the outer radius R2 of the protruding portion 19 was fixed to about 12.5 mm, i.e., the protrusion amount R3 was fixed to about 3.25 mm, and the thickness T of the weight 21 was changed to the range of equal to or more than about 0 mm and equal to or less than about 2.0 mm for each about 0.2 mm. As described above, the weight of the protruding portion 19 was changed by changing the thickness T of the weight 21 in a state in which the protrusion amount R3 of the protruding portion 19 is fixed.

As shown in FIG. 10, in a case where the thickness T was changed by attaching the weight 21 to the protruding portion 19, it was confirmed that the displacement amount of the protective cover 11 changed. Then, it was confirmed that when the thickness T of the weight 21 was about 2 mm, the change in the displacement amount of the protective cover 11 was equivalent to that of Example 2 of FIG. 8B and shown in FIG. 9 where the outer radius R2 was about 13 mm.

From this, it can be seen that the displacement of the protective cover 11 depends on the weight of the protruding portion 19.

FIG. 11A is a graph showing an example of a relationship between the outer radius R2 of the protruding portion 19, the protrusion amount R3 of the protruding portion 19, and the weight ratio. Note that the weight ratio shown in FIG. 11A is a ratio of the weight of the protruding portion 19 to the weight of the main body portion 18, and is calculated by (weight ratio)=(weight of protruding portion 19)/(weight of main body portion 18).

As described above, in the vibration device 10, when the outer radius R2 of the protruding portion 19 is within the range of equal to or more than about 12.5 mm and equal to or less than about 13.5 mm, that is, the protrusion amount R3 is within the range of equal to or more than about 3.25 mm and equal to or less than about 4.25 mm, the displacement amount of the peripheral portion is larger than that of the central portion of the protective cover 11. As shown in FIG. 11A, in a range in which the weight ratio is equal to or more than about 0.8 and equal to or less than about 1.2, the outer radius R2 of the protruding portion 19 corresponds to a range of equal to or more than about 12.5 mm and equal to or less than about 13.5 mm, i.e., the protrusion amount R3 corresponds to a range of equal to or more than about 3.25 mm and equal to or less than about 4.25 mm. From this, the weight ratio is preferably equal to or more than about 0.8 and equal to or less than about 1.2.

Note that in Preferred Embodiment 1, an example in which a thickness of the protective cover 11 is constant has been described, but the present invention is not limited thereto. For example, the moment of inertia may be taken into consideration except in a case where the protruding portion 19 of the protective cover 11 is extended with a uniform material.

Figure 11A:
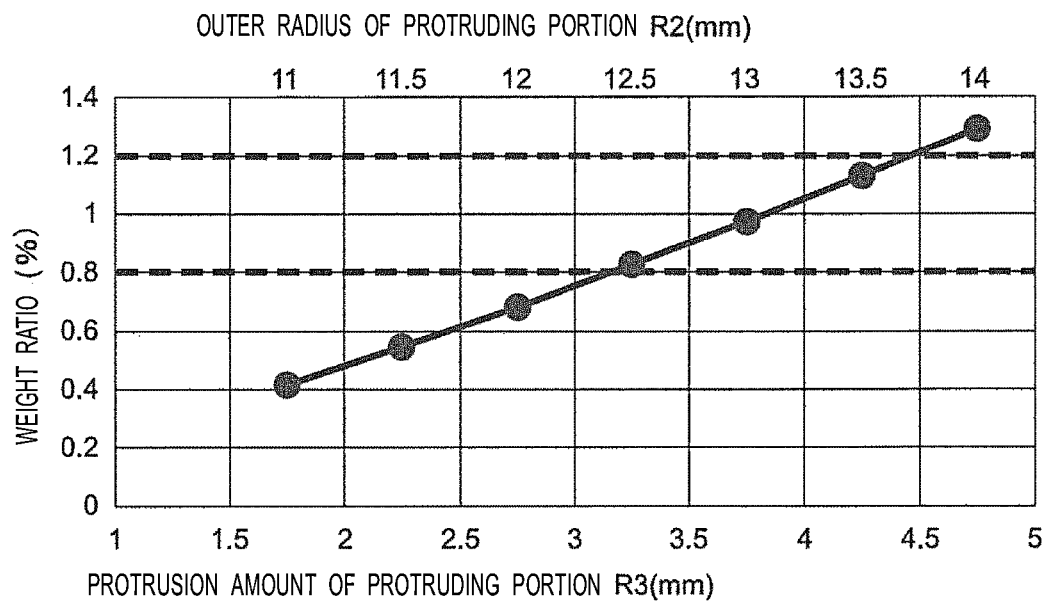
FIG. 11A is a graph showing an example of a relationship between the outer radius of the protruding portion, a protrusion amount of the protruding portion, and a weight ratio.
Figure 11B:
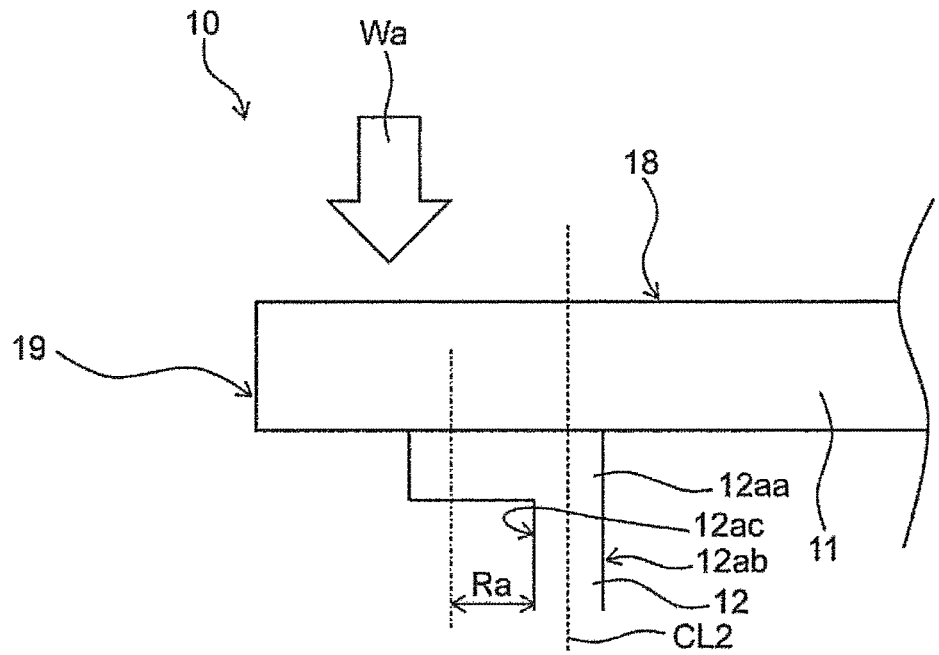
FIG. 11B is a schematic enlarged view of an example of a vibration device including a protective cover having a constant thickness.
Figure 11C:
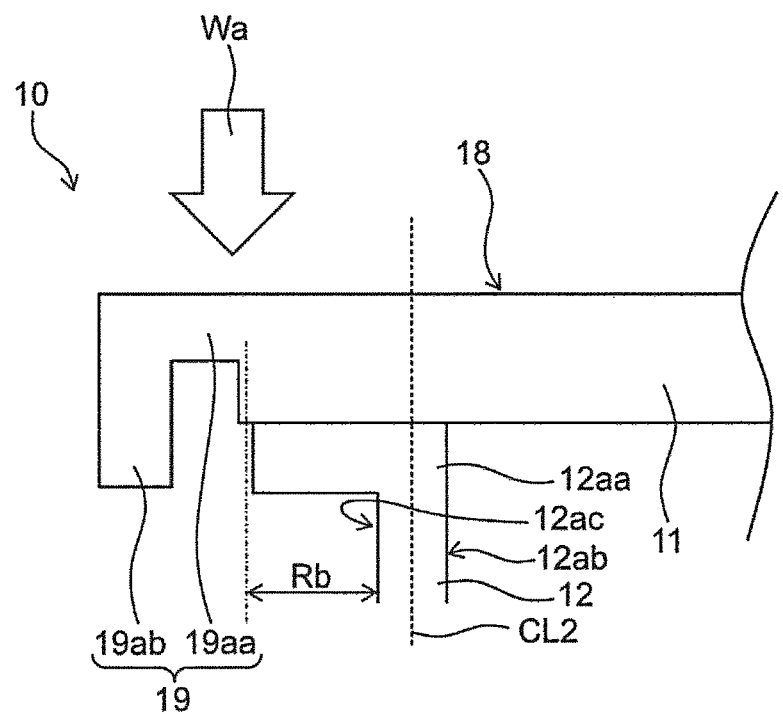
FIG. 11C is a schematic enlarged view of an example of a vibration device including a protective cover in which a thickness of a protruding portion is partially different.

FIG. 11B illustrates a schematic enlarged view of an example of the vibration device 10 including the protective cover 11 having a constant thickness. FIG. 11C illustrates a schematic enlarged view of an example of the vibration device 10 including the protective cover 11 in which a thickness of the protruding portion 19 is partially different. In the example illustrated in FIG. 11B, the weight of the protruding portion 19 having a constant thickness is defined as Wa. In the example illustrated in FIG. 11C, the thickness of the protruding portion 19 is partially different. Specifically, the protruding portion 19 includes a first protruding portion 19aa having a smaller thickness than that of the main body portion 18, and a second protruding portion 19ab having a thickness larger than that of the main body portion 18. In the example illustrated in FIG. 11C, the weight of the protruding portion 19 including the first protruding portion 19aa and the second protruding portion 19ab is set to be the same or substantially the same as the weight of the protruding portion 19 in FIG. 11B.

In the example illustrated in FIG. 11B, a distance from the support portion (outer wall 12ac of the first cylindrical body 12) to the center of gravity of the protruding portion 19 is defined as Ra. In the example illustrated in FIG. 11C, a distance from the support portion (outer wall 12ac of the first cylindrical body 12) to the center of gravity of the protruding portion 19 is defined as Rb. In this case, an equivalent mass Weqv can be calculated by the following equation.

$$W\text{eqv}=(Rb^2/Ra^2)\times Wa \qquad \text{Equation 1}$$

When the equivalent mass Weqv is replaced by the weight of the protruding portion 19, the above relationship is maintained in the same or substantially same manner as the weight ratio. That is, a ratio between the equivalent mass Weqv of the protruding portion 19 and the weight of the main body portion 18 may be equal to or more than about 0.8 and equal to or less than about 1.2, for example.

Vibration Control Method

A non-limiting example of a vibration control method of the vibration device 10 will be described.

Figure 12A:
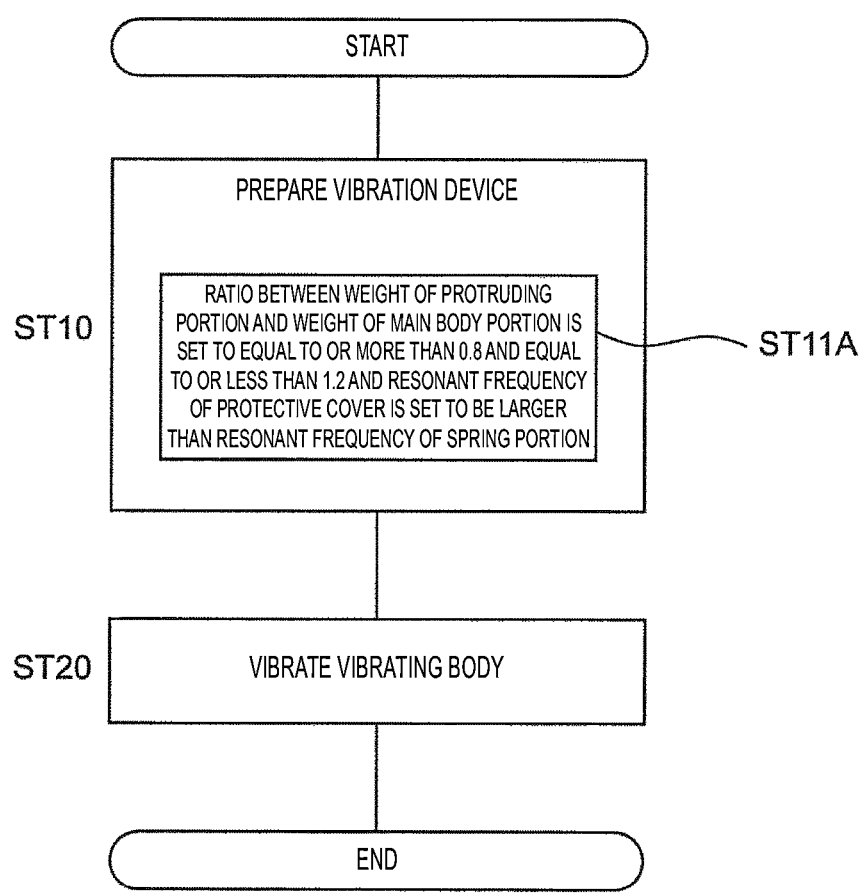
FIG. 12A is a flowchart of an example of a vibration control method according to Preferred Embodiment 1 of the present invention.

FIG. 12A is a flowchart of an example of the vibration control method according to Preferred Embodiment 1 of the present invention. As illustrated in FIG. 12A, the vibration control method includes step ST10 of preparing the vibration device 10, and step ST20 of vibrating the vibrating body 17.

In step ST10, the vibration device 10 is prepared. In addition, step ST10 includes step ST11A in which the ratio between the weight of the protruding portion 19 and the weight of the main body portion 18 is set to equal to or more than about 0.8 and equal to or less than about 1.2, for example, and the resonant frequency of the protective cover 11 is set to be larger than the resonant frequency of the spring portion 13.

In step ST11A, by determining the materials and dimensions of the above described protective cover 11, the first cylindrical body 12, the spring portion 13, and the second cylindrical body 14, the resonant frequency of the protective cover 11 is made to be larger than the resonant frequency of the spring portion 13. Further, in step ST11, for example, the weight of the protruding portion 19 is adjusted such that the ratio between the weight of the protruding portion 19 and the weight of the main body portion 18 is equal to or more than about 0.8 and equal to or less than about 1.2, for example. As for the adjustment of the weight of the protruding portion 19, for example, the protrusion amount of the protruding portion 19 is increased. Alternatively, a weight is attached to the protruding portion 19, and the protruding portion 19 is chamfered.

In step ST20, the vibrating body 17 is vibrated by the excitation circuit 2. Specifically, in step ST20, a drive signal to generate a vibration is applied to the piezoelectric element 15 of the vibrating body 17 by the excitation circuit 2. Accordingly, the piezoelectric element 15 vibrates in the penetrating direction of the second cylindrical body 14 based on the drive signal from the excitation circuit 2.

As described above, by performing steps ST10 and ST20, the displacement amount of the peripheral portion of the protective cover 11 can be made larger than that of the central portion, and the protective cover 11 can be vibrated.

Figure 12B:
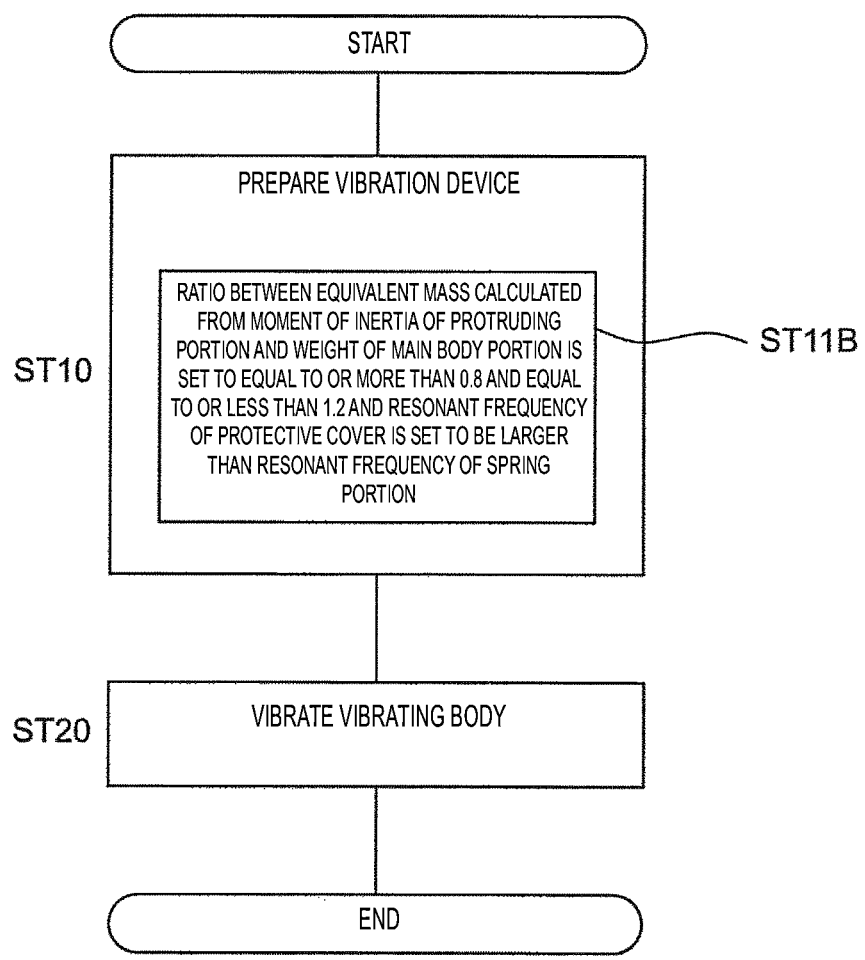
FIG. 12B is a flowchart of another example of the vibration control method according to Preferred Embodiment 1 of the present invention.

FIG. 12B is a flowchart of another non-limiting example of a vibration control method according to Preferred Embodiment 1 of the present invention. As illustrated in FIG. 12B, step ST10 may include step ST11B instead of step ST11A. In step ST11B, the ratio between the equivalent mass calculated from the moment of inertia of the protruding portion 19 and the weight of the main body portion 18 is set to equal to or more than about 0.8 and equal to or less than about 1.2, for example, and the resonant frequency of the protective cover 11 is set to be larger than the resonant frequency of the spring portion 13. Note that the vibration control method illustrated in 12B is the same or substantially the same as the control method illustrated in FIG. 12A in the other points.

With the vibration device 10 and the vibration control method according to Preferred Embodiment 1, the following advantageous effects can be obtained.

The vibration device 10 includes the protective cover (light transmissive body) 11, the first cylindrical body 12, the spring portion 13, the second cylindrical body 14, and the vibrating body 17. The protective cover 11 transmits light having a predetermined wavelength. The first cylindrical body 12 has a cylindrical shape including a first end and a second end, and supports the protective cover 11 at the first end. The spring portion 13 has a plate shape, and supports the second end of the first cylindrical body 12. The second cylindrical body 14 has a cylindrical shape including a first end and a second end, and supports, at the first end, a position of the spring portion 13 in an outer side portion of a position at which the first cylindrical body 12 is supported. The vibrating body 17 is on the second end side of the second cylindrical body 14, and vibrates in the penetrating direction of the second cylindrical body 14. The protective cover 11 includes the main body portion 18 and the protruding portion 19. The main body portion 18 is located on an inner side of a portion supported by the first cylindrical body 12. The protruding portion 19 extends from the main body portion 18 toward the outer circumference of the protective cover 11, and protrudes outward more than the portion supported by the first cylindrical body 12. The ratio between the equivalent mass calculated from the moment of inertia of the protruding portion 19 and the weight of the main body portion 18 is equal to or more than about 0.8 and equal to or less than about 1.2, for example. The protective cover 11, the first cylindrical body 12, the spring portion 13, and the second cylindrical body 14 are configured such that the resonant frequency of the protective cover 11 is larger than the resonant frequency of the spring portion 13.

Alternatively, the vibration device 10 includes the protective cover (light transmissive body) 11, the first cylindrical body 12, the spring portion 13, the second cylindrical body 14, and the vibrating body 17. The protective cover 11 transmits light having a predetermined wavelength. The first cylindrical body 12 has a cylindrical shape including a first end and a second end, and supports the protective cover 11 at the first end. The spring portion 13 has a plate shape, and supports the second end of the first cylindrical body 12. The second cylindrical body 14 has a cylindrical shape including a first end and a second end, and supports, at the first end, a position of the spring portion 13 in an outer side portion of a position at which the first cylindrical body 12 is supported. The vibrating body 17 is on the second end side of the second cylindrical body 14, and vibrates in the penetrating direction of the second cylindrical body 14. The protective cover 11 includes the main body portion 18 and the protruding portion 19. The main body portion 18 is located on an inner side of a portion supported by the first cylindrical body 12. The protruding portion 19 extends from the main body portion 18 toward the outer circumference of the protective cover 11, and protrudes outward more than the portion supported by the first cylindrical body 12. The ratio between the weight of the protruding portion 19 and the weight of the main body portion 18 is equal to or more than about 0.8 and equal to or less than about 1.2, for example. The protective cover 11, the first cylindrical body 12, the spring portion 13, and the second cylindrical body 14 are configured such that the resonant frequency of the protective cover 11 is larger than the resonant frequency of the spring portion 13.

With such a configuration, it is possible to remove foreign matter, such as liquid droplets, for example, while maintaining the field of view of the protective cover 11. Specifically, making the displacement amount of the peripheral portion larger than that of the central portion of the protective cover 11 by the vibration of the vibrating body 17, the protective cover 11 can be vibrated. As such, the liquid droplets adhering to the surface of the protective cover 11 can be moved from the central portion of the protective cover 11 to the peripheral portion. As a result, it is possible to remove the liquid droplets while reducing or preventing interference with the field of view due to the collection of the liquid droplets in the central portion of the protective cover 11.

The vibrating body 17 includes the vibration plate 16 and the piezoelectric element 15. The vibration plate 16 has a plate shape, and extends outward from the other end of the second cylindrical body 14. The piezoelectric element 15 is provided on the lower surface of the vibration plate 16. With such a configuration, the vibration of the vibrating body 17 can be more easily transmitted to the first cylindrical body 12, the spring portion 13, and the second cylindrical body 14. This makes it easier for the vibrating body 17 to vibrate the protective cover 11 via the first cylindrical body 12, the spring portion 13, and the second cylindrical body 14.

The protective cover 11 has a disk shape. The spring portion 13, the vibration plate 16, and the piezoelectric element 15 have an annular plate shape. The first cylindrical body 12 and the second cylindrical body 14 have a cylinder shape. With such a configuration, the vibration by the vibrating body 17 is easily transmitted by the protective cover 11.

The vibration device 10 further includes the excitation circuit 2 that excites the vibrating body 17. With such a configuration, it is possible to vibrate the vibrating body 17.

The vibration control method includes step ST10 of preparing the vibration device 10, and step ST20 of vibrating the vibrating body 17. In step ST10, the vibration device 10 including the protective cover (light transmissive body) 11, the first cylindrical body 12, the spring portion 13, the second cylindrical body 14, and the vibrating body 17 is prepared. Here, the protective cover 11 transmits light having a predetermined wavelength. The first cylindrical body 12 has a cylindrical shape including a first end and a second end, and supports the protective cover 11 at the first end. The spring portion 13 has a plate shape, and supports the second end of the first cylindrical body 12. The second cylindrical body 14 has a cylindrical shape including a first end and a second end, and supports, at the first end, a position of the spring portion 13 in an outer side portion of a position at which the first cylindrical body 12 is supported. The vibrating body 17 is on the second end side of the second cylindrical body 14, and vibrates in the penetrating direction of the second cylindrical body 14. The protective cover 11 includes the main body portion 18 and the protruding portion 19. The main body portion 18 is located on the inner side of the portion supported by the first cylindrical body 12. The protruding portion extends from the main body portion 18 toward the outer circumference of the protective cover 11, and protrudes outward more than the portion supported by the first cylindrical body 12. In addition, step ST10 includes step ST11 of configuring the protective cover 11, the first cylindrical body 12, the spring portion 13, and the second cylindrical body 14 such that the resonant frequency of the protective cover 11 is larger than the resonant frequency of the spring portion 13.

With such a configuration, it is possible to remove foreign matter such as liquid droplets, for example, while maintaining the field of view of the protective cover 11. Specifically, making the displacement amount of the peripheral portion larger than that of the central portion of the protective cover 11 by the vibration of the vibrating body 17, the protective cover 11 can be vibrated. As such, the liquid droplets adhering to the surface of the protective cover 11 can be moved from the central portion of the protective cover 11 to the peripheral portion. As a result, it is possible to remove the liquid droplets while reducing or preventing the interference with the field of view due to the collection of the liquid droplets in the central portion of the protective cover 11.

Note that in Preferred Embodiment 1, an example in which the protective cover 11 has a disk shape has been described, but the present invention is not limited thereto. For example, the protective cover 11 may have, for example, a dome shape, a shape in which cylinders are joined, a curved surface shape smaller than a hemisphere, and the like.

Further, the protective cover 11 may be a simple glass cover, or may be an optical component such as, for example, a concave lens, a convex lens, or a planar lens.

In Preferred Embodiment 1, an example in which the first cylindrical body 12 and the second cylindrical body 14 have a cylinder shape has been described, but the present invention is not limited thereto. The first cylindrical body 12 and the second cylindrical body 14 may have a cylindrical shape.

In Preferred Embodiment 1, an example in which the flange 12*aa* is provided at the first end of the first cylindrical body 12 has been described, but the present invention is not limited thereto. The flange 12aa is not a necessary configuration.

In Preferred Embodiment 1, an example in which the vibration device 10 includes the excitation circuit 2 has been described, but the present invention is not limited thereto. The vibration device 10 may not include the excitation circuit 2. In this case, for example, the vibration device 10 may receive a drive signal to generate vibration from an external device that is separate from the vibration device 10 and apply the drive signal to the piezoelectric element 15.

In Preferred Embodiment 1, an example in which the piezoelectric element 15 is provided on the lower surface of the vibration plate 16 has been described, but the present invention is not limited thereto. For example, the piezoelectric element 15 may be provided on an upper surface of the vibration plate 16.

Further, for example, a plurality of rectangular piezoelectric elements 15 may be concentrically provided on the upper surface or the lower surface of the vibration plate 16.

In Preferred Embodiment 1, an example in which the piezoelectric element 15 and the vibration plate 16 are separate elements has been described, but the present invention is not limited thereto. For example, the piezoelectric element 15 may correspond to the shape of the vibration plate 16, and the piezoelectric element 15 and the vibration plate 16 may be integrally provided.

In Preferred Embodiment 1, an example in which the vibration plate 16 extends outward from the second end of the second cylindrical body 14 has been described, but the present invention is not limited to this. For example, the vibration plate 16 may extend outward from the second end of the second cylindrical body 14.

In Preferred Embodiment 1, an example in which the vibrating body 17 includes the vibration plate 16 has been described, but the present invention is not limited thereto. The vibration plate 16 is not a necessary configuration. In a case where the vibrating body 17 does not include the vibration plate 16, the piezoelectric element 15 may be provided in the second cylindrical body 14.

In Preferred Embodiment 1, an example has been described in which the vibration device 10 moves liquid droplets from the central portion of the protective cover 11 to the peripheral portion and atomizes the liquid droplets in the peripheral portion of the protective cover 11, but the present invention is not limited thereto. In the vibration device 10, it is not necessary to atomize the liquid droplets in the peripheral portion of the protective cover 11. That is, after the vibration device 10 has moved the liquid droplets from the central portion of the protective cover 11 to the peripheral portion, the liquid droplets may not be atomized.

In Preferred Embodiment 1, an example in which the vibration control method includes steps ST10 and ST20 has been described, but the present invention is not limited thereto. For example, steps ST10 and ST20 shown in FIGS. 12A and 12B may be integrated or may be separated into different steps. Alternatively, the flowchart shown in FIGS. 12A and 12B may include additional steps.

Preferred Embodiment 2

A vibration device according to Preferred Embodiment 2 of the present invention will be described. Note that, in Preferred Embodiment 2, points different from Preferred Embodiment 1 will be mainly described. In Preferred Embodiment 2, the same reference numerals denote components that are identical or equivalent to those in Preferred Embodiment 1, and description thereof will be provided. In addition, in Preferred Embodiment 2, description overlapping with Preferred Embodiment 1 will be omitted.

Figure 13:
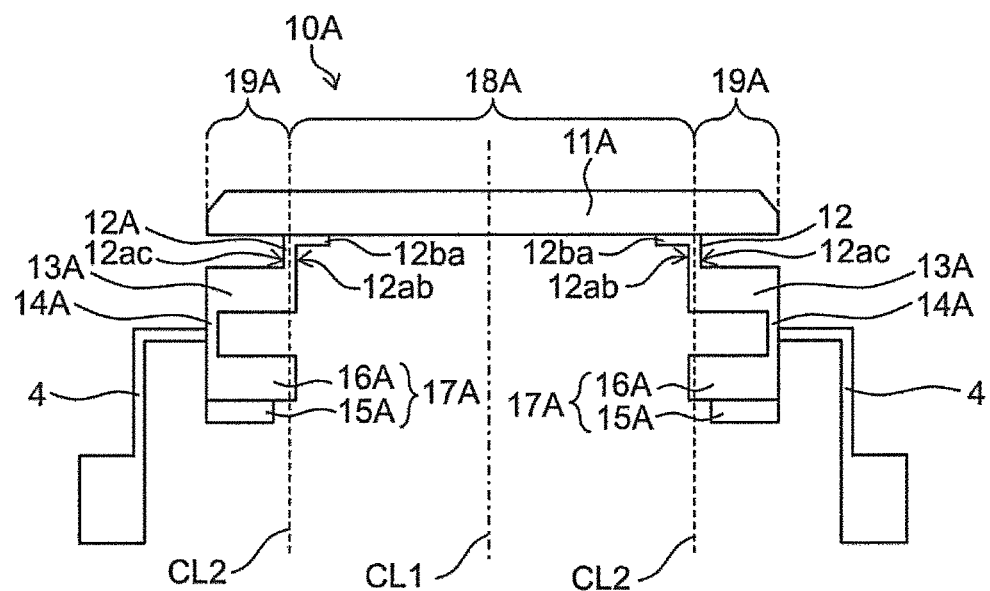
FIG. 13 is a schematic diagram illustrating an example of a configuration of a vibration device according to Preferred Embodiment 2 of the present invention.

FIG. 13 is a schematic diagram illustrating an example of a vibration device 10A according to Preferred Embodiment 2 of the present invention.

Preferred Embodiment 2 is different from Preferred Embodiment 1 in that a vibrating body 17A extends inward from the second end of a second cylindrical body 14A.

In Preferred Embodiment 2, unless otherwise specifically described, the vibration device 10A has the same or substantially the same configuration as that of the vibration device 10 of Preferred Embodiment 1.

As illustrated in FIG. 13, in the vibration device 10A, the vibrating body 17A is provided at the second end of the second cylindrical body 14A and vibrates in a penetrating direction of the second cylindrical body 14A (in the up-down direction in the figure).

The vibrating body 17A includes a piezoelectric element 15A and a vibration plate 16A. The piezoelectric element 15A is provided on a lower surface of the vibration plate 16A. The vibration plate 16A extends inward from a position at which a bottom surface of the second cylindrical body 14 is supported. When the piezoelectric element 15A vibrates in the penetrating direction of the second cylindrical body 14A, the vibration plate 16A vibrates in the penetrating direction of the second cylindrical body 14A.

The piezoelectric element 15A preferably has an annular plate shape having an outer diameter of equal to or more than about 8 mm and equal to or less than about 35 mm, an inner diameter of equal to or more than about 8 mm and equal to or less than about 28 mm, and a thickness of equal to or more than about 0.1 mm and equal to or less than about 3 mm, for example.

The vibration plate 16A preferably has an annular plate shape having an outer diameter of equal to or more than about 10 mm and equal to or less than about 40 mm, an inner diameter of equal to or more than about 6 mm and equal to or less than about 30 mm, and a thickness of equal to or more than about 0.2 mm and equal to or less than about 5 mm, for example.

In Preferred Embodiment 2, a flange 12ba is provided at first end of a first cylindrical body 12A. The flange 12ba extends inward from the first end of the first cylindrical body 12A. As such, it is possible to reduce or prevent an increase of the weight of the protruding portion 19 by the flange 12ba.

Further, in Preferred Embodiment 2, the protruding portion 19 is chamfered. This makes it possible to reduce the weight of the protruding portion 19.

Operation

An example of an operation of the vibration device 10A of Preferred Embodiment 2 will be described.

Figure 14:
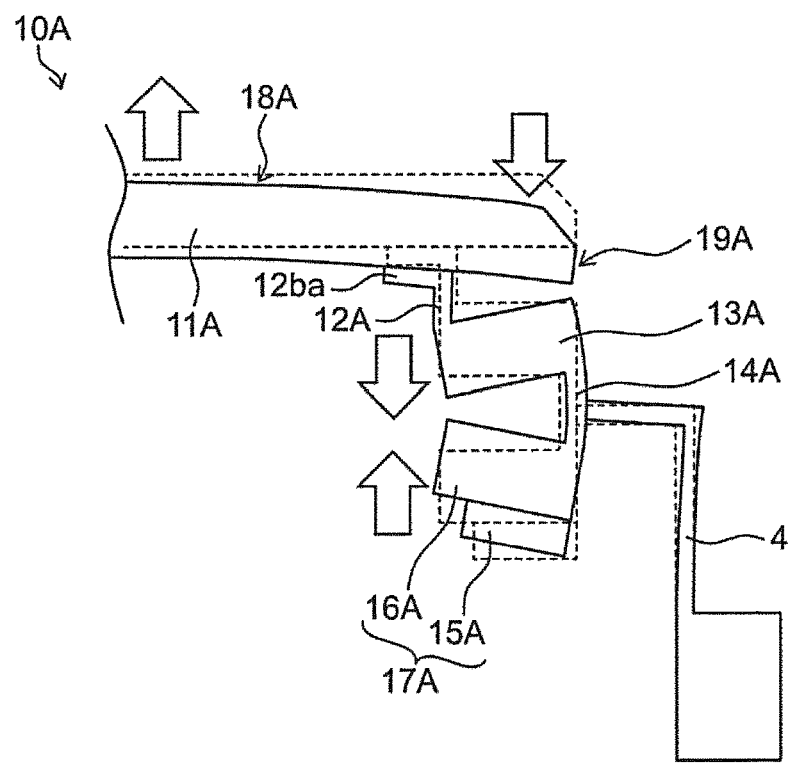
FIG. 14 is an enlarged schematic view illustrating an example of an operation of the vibration device of FIG. 13.

FIG. 14 is an enlarged schematic view illustrating an example of the operation of the vibration device 10A of FIG. 13. FIG. 14 illustrates an example of the vibration of the vibration device 10A of Preferred Embodiment 2. In FIG. 14, a reference position of the vibration device 10A before the start of the vibration is indicated by a broken line, and a position of the vibration device 10A after the displacement is indicated by a solid line.

As illustrated in FIG. 14, the piezoelectric element 15A vibrates in the penetrating direction of the second cylindrical body 14A based on the drive signal from the excitation circuit 2 (see FIG. 5). As such, when the vibration plate 16A is displaced upward, the second cylindrical body 14A is displaced upward, and the position of a spring portion 13A at which the first cylindrical body 12A is supported sinks downward. The position of the spring portion 13A at which the first cylindrical body 12A is supported sinks downward, so that the first cylindrical body 12A is displaced downward. As a result, a protruding portion 19A of a protective cover 11A supported by the first cylindrical body 12A is displaced downward. That is, a peripheral portion of the protective cover 11A is displaced downward. On the other hand, in a main body portion 18A located on an inner side of a portion supported by the first cylindrical body 12A, a central portion of the protective cover 11A is displaced upward in a displacement amount smaller than that of the peripheral portion. Alternatively, the central portion of the protective cover 11A is not displaced.

Although not illustrated, the piezoelectric element 15A vibrates in the penetrating direction of the second cylindrical body 14A based on the drive signal from the excitation circuit 2 (see FIG. 5), such that the vibration plate 16A is displaced downward, the second cylindrical body 14A is displaced downward, and thus the position of the spring portion 13A at which the first cylindrical body 12A is supported rises upward. The position of the spring portion 13A at which the first cylindrical body 12A is supported rises upward, so that the first cylindrical body 12A is displaced upward. As a result, the protruding portion 19A of the protective cover 11A supported by the first cylindrical body 12A is displaced upward. That is, the peripheral portion of the protective cover 11A is displaced upward. On the other hand, in the main body portion 18A located on the inner side of the portion supported by the first cylindrical body 12A, the central portion of the protective cover 11A is displaced downward in a displacement amount smaller than that of the peripheral portion. Alternatively, the central portion of the protective cover 11A is not displaced.

For the vibration device 10A of Preferred Embodiment 2, an evaluation for examining the change in the displacement amount in the protective cover 11 was performed by using Example 4 of a preferred embodiment of the present invention. Preferred Embodiment 4 has the same configuration as that of the vibration device 10A according to Preferred Embodiment 2 described above.

The vibration device 10A used in Example 4 will be described.

In Example 4, the protective cover 11A has a disk shape having an outer diameter of about 22 mm and a thickness of about 2 mm, for example. The first cylindrical body 12A has a cylinder shape having an outer diameter of about 19 mm, an inner diameter of about 18 mm, and a height of about 1 mm, for example. The spring portion 13A has an annular plate shape having an outer diameter of about 26 mm, an inner diameter of about 18 mm, and a thickness of about 2 mm, for example. The second cylindrical body 14A has a cylinder shape having an outer diameter of about 26 mm, an inner diameter of about 25 mm, and a height of about 2 mm, for example. The piezoelectric element 15A has an annular plate shape having an outer diameter of about 26 mm, an inner diameter of about 20 mm, and a thickness of about 1 mm, for example. The vibration plate 16A has an annular plate shape having an outer diameter of about 26 mm, an inner diameter of about 18 mm, and a thickness of about 2 mm, for example. Further, a material for the protective cover 11A is, for example, a light transmissive glass. A material for the first cylindrical body 12A is stainless steel, for example. A material for the spring portion 13A is stainless steel, for example. A material for the second cylindrical body 14A is stainless steel, for example. A material for the piezoelectric element 15A is a PZT ceramic, for example. A material for the vibration plate 16A is stainless steel, for example.

Note that, in Preferred Embodiment 4, the radius R1 defining and functioning as the border line CL2 between the main body portion 18A and the protruding portion 19A in the protective cover 11A is about 9.25 mm, the outer radius R2 of the protruding portion 19A is about 13 mm, and the protrusion amount R3 is about 3.75 mm, for example. A ratio between the weight of the protruding portion 19A and the weight of the main body portion 18A is about 0.975, for example.

Figure 15:
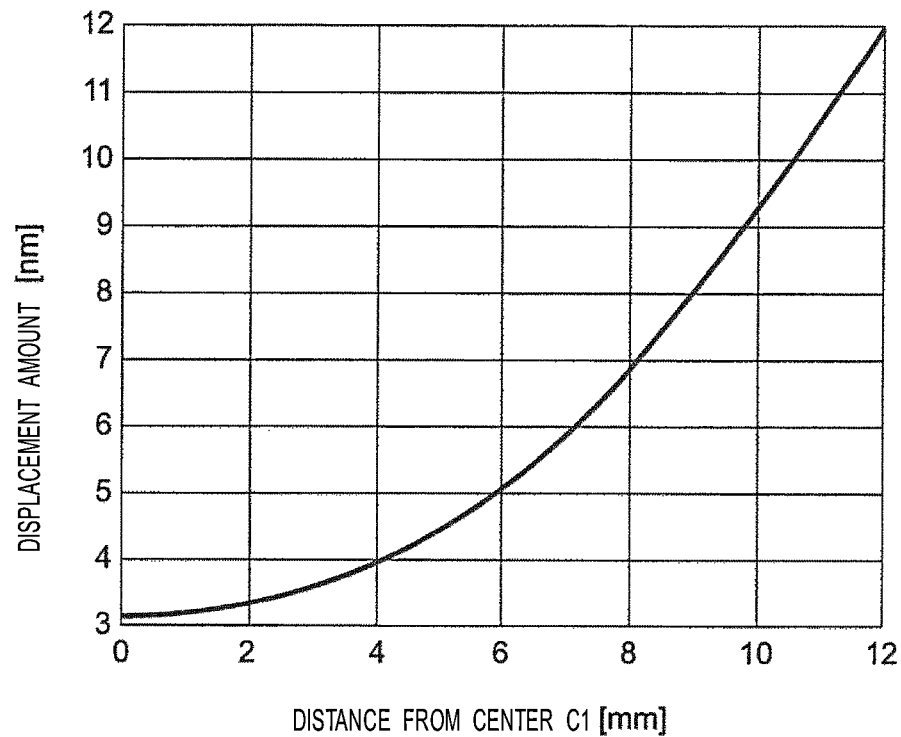
FIG. 15 is a graph showing a change in a displacement amount with respect to a change in a distance from the center of a protective cover in Example 4 of a preferred embodiment of the present invention.

FIG. 15 is a graph showing a change in the displacement amount with respect to the change in a distance from the center Cl of the protective cover 11A in Preferred Embodiment 4. Note that the displacement amount shown in FIG. 15 means a displacement amount per 1 V. As shown in FIG. 15, in Preferred Embodiment 4, the displacement amount of the central portion of the protective cover 11A is about 3 nm. On the other hand, the displacement amount of an outer circumference portion of the protective cover 11A is about 12 nm. As described above, in Preferred Embodiment 4, the displacement amount of the peripheral portion is larger than that of the central portion of the protective cover 11A. When liquid droplets are placed on a surface of the protective cover 11A in this state, the displacement of the peripheral portion is larger than that of the central portion, and therefore, the liquid droplets move toward the peripheral portion. Therefore, in Preferred Embodiment 4, the liquid droplets can be atomized in the peripheral portion of the protective cover 11A.

According to the vibration device 10A according to Preferred Embodiment 2, the following advantageous effects can be obtained.

In the vibration device 10A, the vibrating body 17A has the plate-shaped vibration plate 16A extending inward from the other end of the second cylindrical body 14A, and the piezoelectric element 15A provided on the lower surface of the vibration plate 16A.

With such a configuration, it is possible to remove foreign matter such as liquid droplets, for example, while maintaining the field of view of the protective cover 11A. Specifically, making the displacement amount of the peripheral portion larger than that of the central portion of the protective cover 11 by the vibration of the vibrating body 17A, the protective cover 11A can be vibrated. As such, the liquid droplets adhering to the surface of the protective cover 11A can be moved from the central portion of the protective cover 11A to the peripheral portion. As a result, it is possible to remove the liquid droplets while reducing or preventing the interference with the field of view due to the collection of the liquid droplets in the central portion of the protective cover 11A.

Further, by providing the vibrating body 17A on an inner side from the second end of the second cylindrical body 14A, it is possible to reduce the dimension of the vibration device 10A in the width direction.

Note that, in Preferred Embodiment 2, an example in which the piezoelectric element 15A is provided on the lower surface of the vibration plate 16A has been described, but the present invention is not limited thereto. For example, the piezoelectric element 15A may be provided on an upper surface of the vibration plate 16A.

In Preferred Embodiment 2, an example in which the piezoelectric element 15A and the vibration plate 16A have an annular plate shape has been described, but the present invention is not limited thereto. For example, an outer shape of the piezoelectric element 15A and the vibration plate 16A may be a polygonal shape or an elliptical shape.

In Preferred Embodiment 2, an example in which the flange 12*ba* extends inward from one end of the first cylindrical body 12A has been described, but the present invention is not limited thereto. The flange 12*ba* may extend outward from the first end of the first cylindrical body 12A. Alternatively, the flange 12*ba* may not be provided at one end of the first cylindrical body 12A.

In Preferred Embodiment 2, an example in which the protruding portion 19A is chamfered has been described, but the present invention is not limited thereto. The protruding portion 19A may not be chamfered.

Preferred Embodiment 3

A vibration device according to Preferred Embodiment 3 of the present invention will be described. Note that, in Preferred Embodiment 3, points different from Preferred Embodiment 1 will be mainly described. In Preferred Embodiment 3, the same reference numerals denote components that are identical or equivalent to those in Preferred Embodiment 1, and description thereof will be provided. In addition, in Preferred Embodiment 3, description overlapping with Preferred Embodiment 1 will be omitted.

Figure 16:
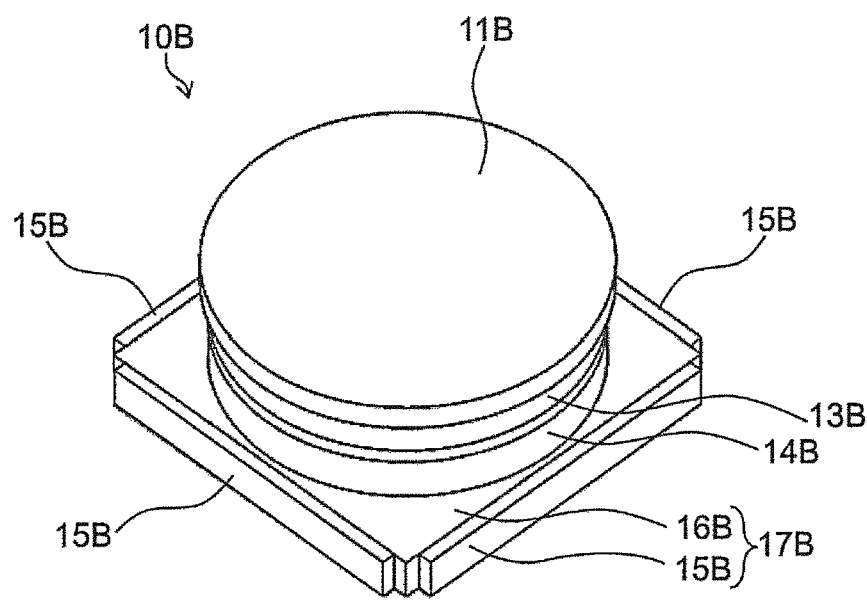
FIG. 16 is a schematic perspective view illustrating an example of a vibration device according to Preferred Embodiment 3 of the present invention.
Figure 17:
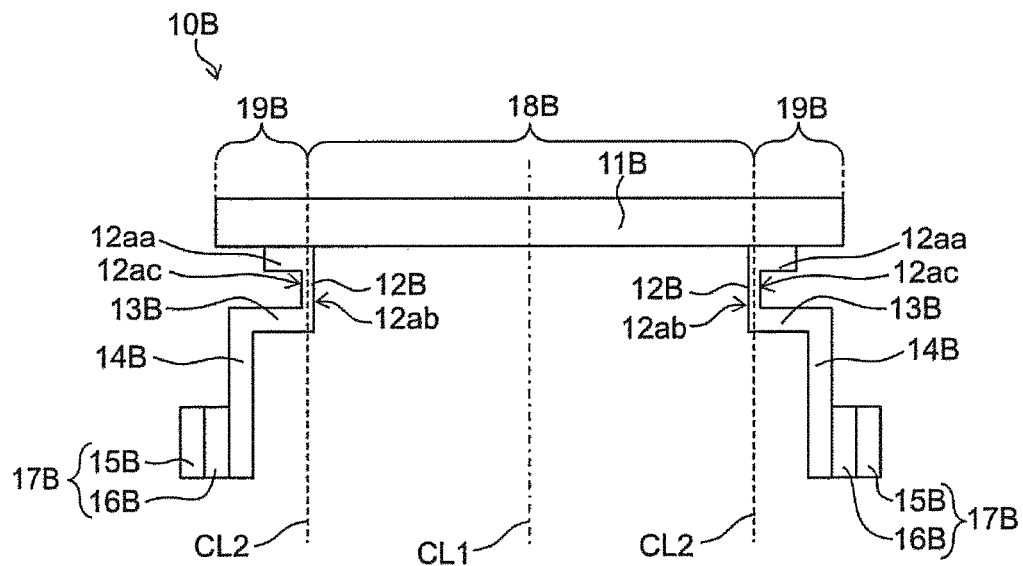
FIG. 17 is a schematic diagram illustrating an example of a configuration of the vibration device according to Preferred Embodiment 3 of the present invention.

FIG. 16 is a schematic diagram illustrating an example of a vibration device 10B according to Preferred Embodiment 3 of the present invention. FIG. 17 is a schematic diagram illustrating an example of a configuration of the vibration device 10B according to Preferred Embodiment 3 of the present invention.

Preferred Embodiment 3 is different from Preferred Embodiment 1 in that a vibrating body 17B is provided on a side surface of a second cylindrical body 14B.

In Preferred Embodiment 3, unless otherwise specifically described, the vibration device 10B has the same or substantially the same configuration as that of the vibration device 10 of Preferred Embodiment 1.

As illustrated in FIG. 16 and FIG. 17, in the vibration device 10B, the vibrating body 17B is provided on a side surface of the second cylindrical body 14B, and vibrates in a direction perpendicular or substantially perpendicular to a penetrating direction (up-down direction) of the second cylindrical body 14B.

The vibrating body 17B includes a plurality of piezoelectric elements 15B and a vibration plate 16B.

The plurality of piezoelectric elements 15B is a rectangular plate-shaped member. The plurality of piezoelectric elements 15B are provided on a side surface (outer peripheral surface) of the vibration plate 16B. The plurality of piezoelectric elements 15B surround a side surface of the vibration plate 16.

The vibration plate 16B is provided on the side surface on the second end side of the second cylindrical body 14B, and supports the second cylindrical body 14B. The vibration plate 16B is a rectangular or substantially rectangular plate-shaped structure. Specifically, an external appearance of the vibration plate 16B has a rectangular or substantially rectangular shape in a plan view of the vibration device 10B.

The plurality of piezoelectric elements 15B are provided on opposing side surfaces of the vibration plate 16B. Therefore, the plurality of piezoelectric elements 15B face each other in a plurality of directions.

The vibration device 10B vibrates the plurality of piezoelectric elements 15B in a direction perpendicular or substantially perpendicular to the penetrating direction of the second cylindrical body 14B. In other words, the vibration device 10B vibrates the plurality of piezoelectric elements 15B provided on the opposing side surfaces of the vibration plate 16B toward an inner side or an outer side of the second cylindrical body 14B. As such, the vibration plate 16B vibrates in a direction perpendicular or substantially perpendicular to the penetrating direction of the second cylindrical body 14A, i.e., toward the inner side or the outer side of the second cylindrical body 14B.

Each of the plurality of piezoelectric elements 15B has a rectangular or substantially rectangular plate shape having a vertical length of equal to or more than about 1 mm and equal to or less than about 10 mm, a horizontal length of equal to or more than about 10 mm and equal to or less than about 50 mm, and a thickness of equal to or more than about 0.1 mm and equal to or less than about 3 mm, for example. Here, the vertical length refers to a dimension in the up-down direction in FIG. 17, the horizontal length refers to a dimension in a direction perpendicular to the drawing sheet in FIG. 17, and the thickness refers to a dimension in a right-left direction in FIG. 17.

The external appearance of the vibration plate 16B has a rectangular or substantially rectangular plate shape having a width of equal to or more than about 0 mm and equal to or less than about 3 mm, a depth of equal to or more than about 10 mm and equal to or less than about 50 mm, and a height of equal to or more than about 1 mm and equal to or less than about 10 mm, for example. Here, the width refers to a dimension in the direction perpendicular to the drawing sheet in FIG. 17, the depth refers to a dimension in the right-left direction in FIG. 17, and the height refers to a dimension in the up-down direction in FIG. 17.

In Preferred Embodiment 3, for example, four piezoelectric elements 15B are provided on four side surfaces of the vibration plate 16B. In addition, in the arrangement of the four piezoelectric elements 15B, two piezoelectric elements 15B face each other. Note that the number of the piezoelectric elements 15B is not limited to four. For example, the number of the piezoelectric elements 15B may be two. In this case, the two piezoelectric elements 15B are provided on two opposing side surfaces of the vibration plate 16B.

Operation

An example of an operation of the vibration device 10B of Preferred Embodiment 3 will be described.

Figure 18:
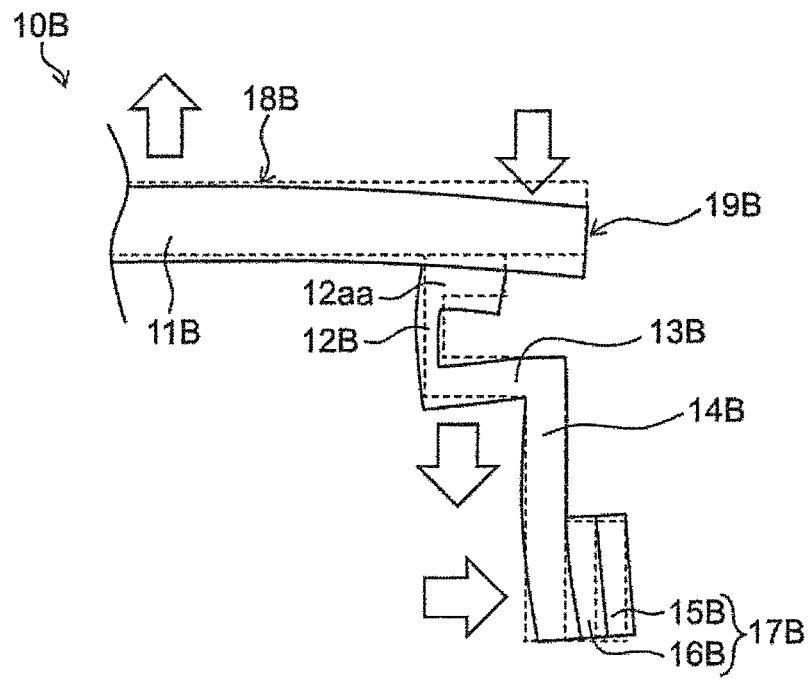
FIG. 18 is an enlarged schematic view illustrating an example of an operation of the vibration device of FIG. 17.

FIG. 18 is an enlarged schematic view illustrating an example of the operation of the vibration device 10B of FIG. 17. FIG. 18 illustrates an example of the vibration of the vibration device 10B of Preferred Embodiment 3. In FIG. 18, a reference position of the vibration device 10B before the start of the vibration is indicated by a broken line, and a position of the vibration device 10B after the displacement is indicated by a solid line.

As illustrated in FIG. 18, the plurality of piezoelectric elements 15B vibrate toward the outer side of the second cylindrical body 14B based on the drive signal from the excitation circuit 2 (see FIG. 5). As such, when the vibration plate 16B is displaced toward the outer side of the second cylindrical body 14B, the second cylindrical body 14B is displaced in the outer side direction, and the position of a spring portion 13B at which a first cylindrical body 12B is supported sinks downward. The position of the spring portion 13B sinks downward, so that the first cylindrical body 12B is displaced downward. As a result, a protruding portion 19B of a protective cover 11B supported by the first cylindrical body 12B is displaced downward. That is, the peripheral portion of the protective cover 11B is displaced downward. On the other hand, in a main body portion 18B located on an inner side of the portion supported by the first cylindrical body 12B, the central portion of the protective cover 11B is displaced upward in a displacement amount smaller than that of the peripheral portion. Alternatively, the central portion of the protective cover 11B is not displaced.

Although not illustrated, the plurality of piezoelectric elements 15B vibrate toward the inner side of the second cylindrical body 14B based on the drive signal from the excitation circuit 2 (see FIG. 5). As such, when the vibration plate 16B is displaced toward the inner side of the second cylindrical body 14B, the second cylindrical body 14B is displaced in the inner side direction, and the position of the spring portion 13B at which the first cylindrical body 12B is supported rises upward. The position of the spring portion 13B rises upward, so that the first cylindrical body 12B is displaced upward. As a result, the protruding portion 19B of the protective cover 11B supported by the first cylindrical body 12B is displaced upward. That is, the peripheral portion of the protective cover 11B is displaced upward. On the other hand, in the main body portion 18B located on the inner side of the portion supported by the first cylindrical body 12B, the central portion of the protective cover 11B is displaced downward in a displacement amount smaller than that of the peripheral portion. Alternatively, the central portion of the protective cover 11B is not displaced.

With the vibration device 10B according to Preferred Embodiment 3, the following advantageous effects can be obtained.

In the vibration device 10B, the vibrating body 17B is provided on the side surface of the second cylindrical body 14B and vibrates in a direction perpendicular or substantially perpendicular to the penetrating direction of the second cylindrical body 14B.

With such a configuration, it is possible to remove foreign matter such as liquid droplets, for example, while maintaining the field of view of the protective cover 11B. Specifically, making the displacement amount of the peripheral portion larger than that of the central portion of the protective cover 11B by the vibration of the vibrating body 17B, the protective cover 11B can be vibrated. As such, the liquid droplets adhering to the surface of the protective cover 11B can be moved from the central portion of the protective cover 11B to the peripheral portion. As a result, it is possible to remove the liquid droplets while reducing or preventing the interference with the field of view due to the collection of the liquid droplets in the central portion of the protective cover 11B.

Note that in Preferred Embodiment 3, an example in which the vibrating body 17B includes the vibration plate 16B has been described, but the present invention is not limited thereto. The vibrating body 17B may not include the vibration plate 16B. In this case, the vibrating body 17B may include a plurality of piezoelectric elements 15B on the side surfaces of the second cylindrical body 14B.

In Preferred Embodiment 3, an example in which each of the plurality of piezoelectric elements 15B is a rectangular or substantially rectangular plate-shaped member has been described, but the present invention is not limited thereto. For example, the plurality of piezoelectric elements 15B may be defined by a plate-shaped member having a polygonal shape or an elliptical shape.

In Preferred Embodiment 3, an example in which an external appearance of the vibration plate 16B has a rectangular or substantially rectangular shape has been described, but the present invention is not limited thereto. The external appearance of the vibration plate 16B may have a polygonal shape, for example.

Preferred Embodiment 4

A vibration device according to Preferred Embodiment 4 of the present invention will be described. Note that, in Preferred Embodiment 4, points different from Preferred Embodiment 1 will be mainly described. In Preferred Embodiment 4, the same reference numerals denote components that are identical or equivalent to those in Preferred Embodiment 1, and description thereof will be provided. In addition, in Preferred Embodiment 4, description overlapping with Preferred Embodiment 1 will be omitted.

Figure 19:
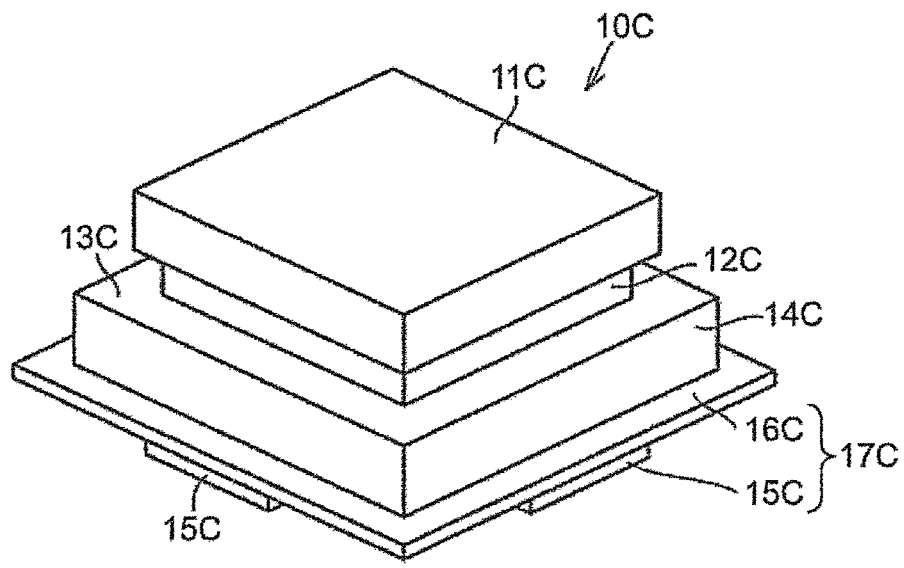
FIG. 19 is a schematic perspective view illustrating an example of a vibration device according to Preferred Embodiment 4 of the present invention.

FIG. 19 is a schematic perspective view illustrating an example of a vibration device 10C of Preferred Embodiment 4 according to the present invention.

Preferred Embodiment 4 is different from Preferred Embodiment 1 in that a protective cover 11C, a first cylindrical body 12C, a spring portion 13C, a second cylindrical body 14C, and a vibrating body 17C have a rectangular or substantially rectangular shape.

In Preferred Embodiment 4, unless otherwise specifically described, the vibration device 10C has the same or substantially the same configuration as that of the vibration device 10 of Preferred Embodiment 1.

As illustrated in FIG. 19, the protective cover 11C, the first cylindrical body 12C, the spring portion 13C, the second cylindrical body 14C, and the vibrating body 17C have a rectangular or substantially rectangular shape in a plan view of the vibration device 10C.

The vibrating body 17C includes a plurality of piezoelectric elements 15C and a vibration plate 16C.

The plurality of piezoelectric elements 15C are provided on a lower surface of the vibration plate 16C, and face each other in a plurality of directions.

The protective cover 11C has a rectangular or substantially rectangular plate shape having a width of equal to or more than about 10 mm and equal to or less than about 40 mm, a depth of equal to or more than about 10 mm and equal to or less than about 40 mm, and a thickness of equal to or more than about 0.7 mm and equal to or less than about 10 mm, for example.

The first cylindrical body 12C has a rectangular cylindrical shape having a width of equal to or more than about 8 mm and equal to or less than about 35 mm, a depth of equal to or more than about 8 mm and equal to or less than about 35 mm, and a height of equal to or more than about 1 mm and equal to or less than about 10 mm, for example, in an external appearance. Further, a thickness of the first cylindrical body 12C is equal to or more than about 0.1 mm and equal to or less than about 2 mm, for example.

The spring portion 13C has a rectangular cylindrical shape having a width of equal to or more than about 10 mm and equal to or less than about 40 mm, and a depth of equal to or more than about 10 mm and equal to or less than about 40 mm, for example, in an external appearance. Further, a thickness of the spring portion 13C is equal to or more than about 0.2 mm and equal to or less than about 5 mm, for example.

The second cylindrical body 14C has a rectangular cylindrical shape having a width of equal to or more than about 12 mm and equal to or less than about 42 mm, a depth of equal to or more than about 12 mm and equal to or less than about 40 mm, and a height of equal to or more than about 2 mm and equal to or less than about 15 mm, for example, in an external appearance. Further, a thickness of the second cylindrical body 14C is equal to or more than about 0.2 mm and equal to or less than about 5 mm, for example.

Each of the plurality of piezoelectric elements 15C has a rectangular or substantially rectangular plate shape having a vertical length of equal to or more than about 8 mm and equal to or less than about 38 mm, a horizontal length of equal to or more than about 1 mm and equal to or less than about 5 mm, and a thickness of equal to or more than about 0.1 mm and equal to or less than about 3 mm, for example.

An external appearance of the vibration plate 16C has a rectangular or substantially rectangular plate shape having a width of equal to or more than about 10 mm and equal to or less than about 50 mm, a depth of equal to or more than about 10 mm and equal to or less than about 50 mm, and a height of equal to or more than about 0.2 mm and equal to or less than about 4 mm, for example.

In Preferred Embodiment 4, for example, four piezoelectric elements 15C are provided on the lower surface of the vibration plate 16C. In addition, in the arrangement of the four piezoelectric elements 15C, two piezoelectric elements 15C face each other. Note that the number of the piezoelectric elements 15C is not limited to four. For example, the number of the piezoelectric elements 15C may be two. In this case, the two piezoelectric elements 15C face each other on the lower surface of the vibration plate 16C.

With the vibration device 10C according to Preferred Embodiment 4, the following advantageous effects can be obtained.

In the vibration device 10C, the protective cover 11C, the first cylindrical body 12C, the spring portion 13C, the second cylindrical body 14C, and the vibrating body 17C have a rectangular or substantially rectangular shape. Also in such a configuration, foreign matter such as liquid droplets, for example, can be removed while maintaining the field of view of the protective cover 11C. Specifically, the liquid droplets can be removed while reducing or preventing the interference with the field of view due to the collection of the liquid droplets in the central portion of the protective cover 11C.

Preferred Embodiment 5

A vibration device according to Preferred Embodiment 5 of the present invention will be described. Note that, in Preferred Embodiment 5, points different from Preferred Embodiment 1 will be mainly described. In Preferred Embodiment 5, the same reference numerals denote components that are identical or equivalent to those in Preferred Embodiment 1, and description thereof will be provided. In addition, in Preferred Embodiment 5, description overlapping with Preferred Embodiment 1 will be omitted.

Figure 20:
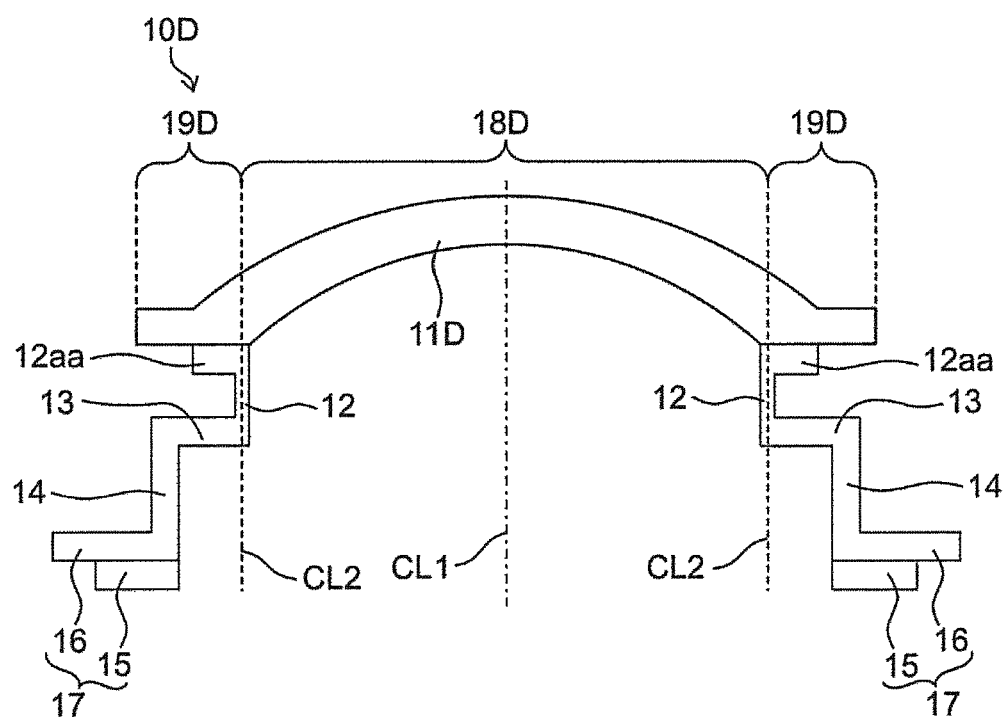
FIG. 20 is a schematic diagram illustrating an example of a vibration device according to Preferred Embodiment 5 of the present invention.

FIG. 20 is a schematic diagram illustrating an example of a vibration device 10D according to Preferred Embodiment 5 of the present invention.

Preferred Embodiment 5 is different from Preferred Embodiment 1 in that a protective cover 11D has a dome shape.

In Preferred Embodiment 5, unless otherwise specifically described, the vibration device 10D has the same or substantially the same configuration as that of the vibration device 10 of Preferred Embodiment 1.

As illustrated in FIG. 20, in the vibration device 10D, the protective cover 11D has a dome shape, for example. The dome shape refers to a shape formed by curving a plate-shaped member in a hemispherical shape.

The protective cover 11D includes a main body portion 18D and a protruding portion 19D.

The main body portion 18D is located on the inner side of the portion supported by the first cylindrical body 12, and is a portion curved in a dome shape (hemispherical shape).

The main body portion 18D has a hemispherically curved portion having a radius of equal to or more than about 4 mm and equal to or less than about 15 mm, for example.

The protruding portion 19D extends from the main body portion 18D toward an outer circumference of the protective cover 11D, and protrudes outward more than a portion supported by the first cylindrical body 12. In other words, the protruding portion 19D extends toward the outer circumference of the first cylindrical body 12 more than the portion supported by the first cylindrical body 12.

With the vibration device 10D according to Preferred Embodiment 5, the following advantageous effects can be obtained.

In the vibration device 10D, the protective cover 11D has a dome shape, for example. Also in such a configuration, foreign matter such as liquid droplets, for example, can be removed while maintaining the field of view of the protective cover 11D. Specifically, the liquid droplets can be removed while reducing or preventing the interference with the field of view due to the collection of the liquid droplets in the central portion of the protective cover 11D.

Preferred Embodiment 6

A vibration device according to Preferred Embodiment 6 of the present invention will be described. Note that, in Preferred Embodiment 6, points different from Preferred Embodiment 1 will be mainly described. In Preferred Embodiment 6, the same reference numerals denote components that are identical or equivalent to those in Preferred Embodiment 1, and description thereof will be provided. In addition, in Preferred Embodiment 6, description overlapping with Preferred Embodiment 1 will be omitted.

Figure 21:
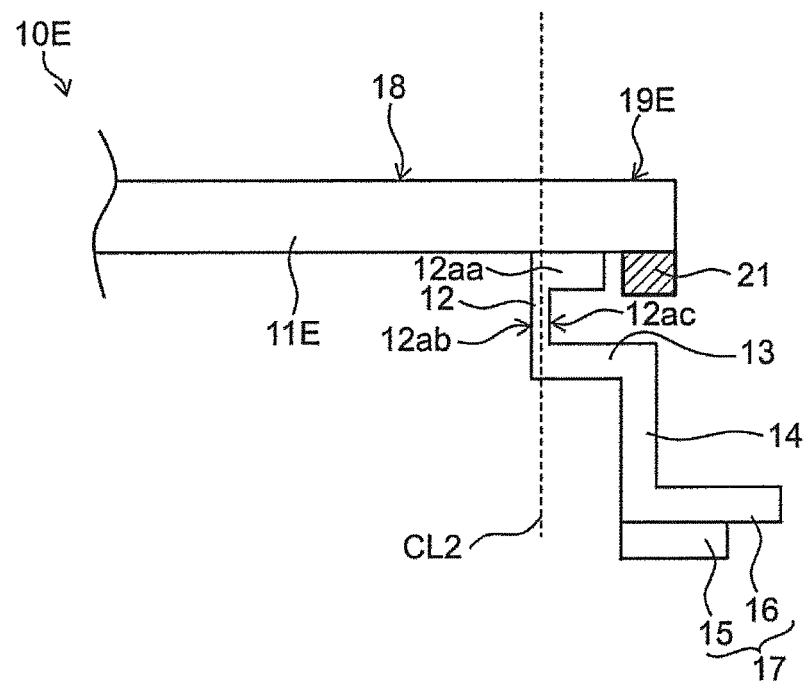
FIG. 21 is a schematic diagram illustrating an example of a vibration device according to Preferred Embodiment 6 of the present invention.

FIG. 21 is a schematic diagram illustrating an example of a vibration device 10E according to Preferred Embodiment 6 of the present invention.

Preferred Embodiment 6 is different from the Preferred Embodiment 1 in that a protruding portion 19E includes a weight 21.

In Preferred Embodiment 6, unless otherwise specifically described, the vibration device 10E has the same or substantially the same configuration as that of the vibration device 10 of Preferred Embodiment 1.

As illustrated in FIG. 21, in a protective cover 11E, the weight 21 is provided on a lower surface of the protruding portion 19E.

The weight 21 is an object that increases the weight of the protruding portion 19E. The weight 21 has an annular plate shape. The weight 21 can increase the weight of the protruding portion 19E.

With the vibration device 10E according to Preferred Embodiment 6, the following advantageous effects can be obtained.

In the vibration device 10E, the protruding portion 19E includes the weight 21. With such a configuration, it is possible to increase the weight of the protruding portion 19E by the weight 21. Accordingly, the weight of the protruding portion 19E can be adjusted without changing the shape of the protruding portion 19E, for example, the protrusion amount R3.

Further, by providing the weight 21 on the lower surface of the protruding portion 19E, an outer diameter of the protective cover 11E can be made small as compared with the protective cover 11 of Preferred Embodiment 1. As such, it is possible to achieve a reduction in the size of the vibration device 10E.

Note that in Preferred Embodiment 6, an example in which the protruding portion 19E includes one weight 21 has been described, but the present invention is not limited thereto. For example, the protruding portion 19E may have one or a plurality of weights 21.

In Preferred Embodiment 6, an example in which the weight 21 has an annular plate shape has been described, but the present invention is not limited thereto. For example, the plurality of weights 21 having a rectangular shape may be provided on a concentric circle.

In Preferred Embodiment 6, an example in which the weight 21 is provided on the lower surface of the protruding portion 19E has been described, but the present invention is not limited thereto. For example, the weight 21 may be provided on a side surface of the protruding portion 19E.

Figure 22:
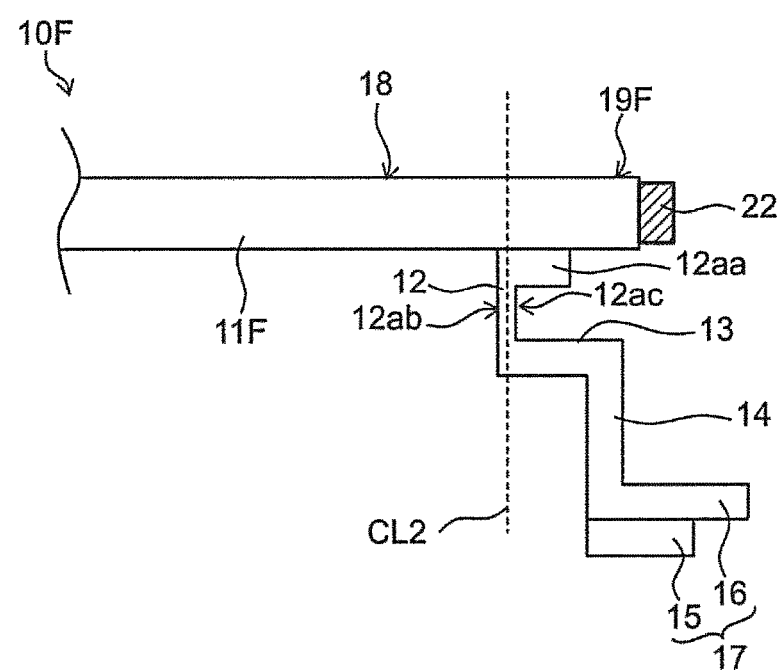
FIG. 22 is a schematic diagram illustrating a vibration device of a modified example according to Preferred Embodiment 6 of the present invention.

FIG. 22 is a schematic diagram illustrating a vibration device 10F of a modified example of Example 6 according to the present invention. As illustrated in FIG. 22, in a protective cover 11F of the vibration device 10F, a weight 22 is provided on a side surface of a protruding portion 19F. Also in such a configuration, the weight of the protruding portion 19E can be increased by the weight 22, and the weight of the protruding portion 19E can be adjusted.

Preferred Embodiment 7

A vibration device according to Preferred Embodiment 7 of the present invention will be described. Note that, in Preferred Embodiment 7, points different from Preferred Embodiment 1 will be mainly described. In Preferred Embodiment 7, the same reference numerals denote components that are identical or equivalent to those in Preferred Embodiment 1, and description thereof will be provided. In addition, in Preferred Embodiment 7, description overlapping with Preferred Embodiment 1 will be omitted.

Figure 23:
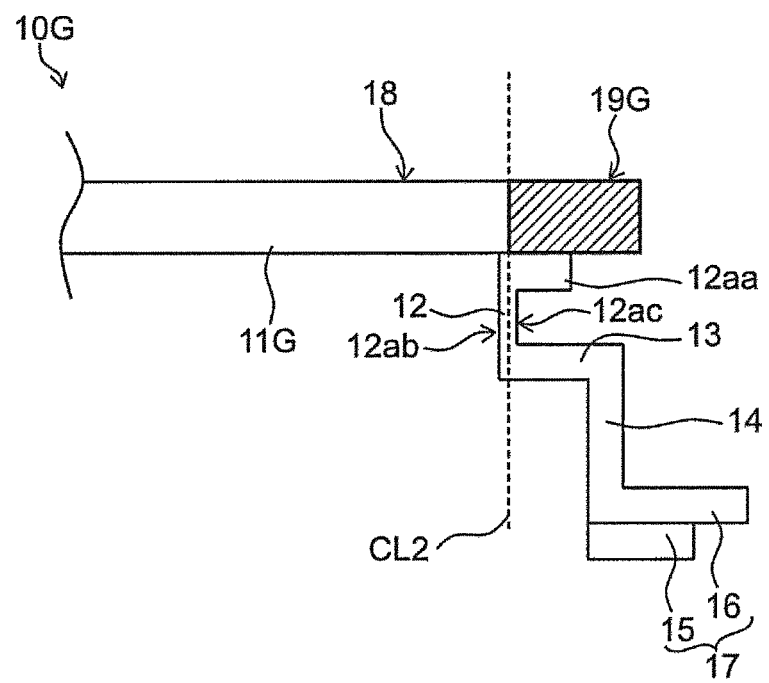
FIG. 23 is a schematic diagram illustrating an example of a vibration device according to Preferred Embodiment 7 of the present invention.

FIG. 23 is a schematic diagram illustrating an example of a vibration device 10G according to Preferred Embodiment 7 of the present invention.

Preferred Embodiment 7 is different from Preferred Embodiment 1 in that the protruding portion 19E is made of a material different from that of the main body portion 18.

In Preferred Embodiment 7, unless otherwise specifically described, the vibration device 10G has the same or substantially the same configuration as that of the vibration device 10 of Preferred Embodiment 1.

As illustrated in FIG. 23, in a protective cover 11G, a protruding portion 19G is made of a material different from that of the main body portion 18.

Examples of a material for the protruding portion 19G include metals such as stainless steel and aluminum, ceramics having a close expansion coefficient to glass, resins capable of adding other functions freely in shape, and the like.

Note that the main body portion 18 is made of the material for forming the protective cover 11 described in Preferred Embodiment 1.

With the vibration device 10G according to Preferred Embodiment 7, the following advantageous effects can be obtained.

In the vibration device 10G, the material of the protruding portion 19E is different from the material of the main body portion 18. With such a configuration, the weight of the protruding portion 19E can be adjusted by the selection of the material.

Further, since the protruding portion 19E is located outside the field of view of the protective cover 11G, the degree of freedom in selecting the material is high as compared with the main body portion 18.

Although the present invention has been described in more detail relating to the preferred embodiments with reference to the accompanying drawings, various changes and modifications will be apparent to those skilled in the art. It should be understood that such changes and modifications are included therein without departing from the scope of the present invention as defined by the appended claims.

Vibration devices and vibration control methods of preferred embodiments of the present invention can be applied to an in-vehicle camera used outdoors, a monitoring camera, or an optical sensor such as LiDAR or the like, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
    a light transmissive body to transmit light of a predetermined wavelength;
    a first cylindrical body having a cylindrical shape including a first end and a second end in an axial direction of the first cylindrical body, and supporting the light transmissive body at the first end;
    a plate-shaped spring portion supporting the second end of the first cylindrical body;
    a second cylindrical body having a cylindrical shape including a first end and a second end in an axial direction of the second cylindrical body, and supporting, at the first end, a position of the spring portion in an outer side portion of a position at which the first cylindrical body is supported; and
    a vibrating body on the second end side of the second cylindrical body to vibrate in the axial direction of the second cylindrical body;
    wherein
    the light transmissive body includes a main body portion on an inner side of a portion supported by the first cylindrical body, and a protruding portion extending from the main body portion toward an outer circumference of the light transmissive body and protruding outward more than a portion supported by the first cylindrical body;
    a ratio between an equivalent mass calculated from a moment of inertia of the protruding portion and a weight of the main body portion is equal to or more than about 0.8 and equal to or less than about 1.2; and
    a resonant frequency of the light transmissive body is larger than a resonant frequency of the spring portion.

2. The vibration device according to claim 1, wherein a material of the protruding portion is different from a material of the main body portion.

3. The vibration device according to claim 1, wherein the protruding portion includes at least one weight.

4. The vibration device according to claim 1, wherein the vibrating body includes:
    a plate-shaped vibration plate extending outward from the second end of the second cylindrical body; and
    a piezoelectric element on an upper surface or a lower surface of the vibration plate.

5. The vibration device according to claim 4, wherein
the light transmissive body has a disk shape or a dome shape; and
the spring portion, the vibration plate; and the piezoelectric element have an annular plate shape.

6. The vibration device according to claim 1, wherein the vibrating body includes:
a plate-shaped vibration plate extending inward from the second end of the second cylindrical body; and
a piezoelectric element on an upper surface or a lower surface of the vibration plate.

7. The vibration device according to claim 6, wherein
the light transmissive body has a disk shape or a dome shape; and
the spring portion, the vibration plate, and the piezoelectric element have an annular plate shape.

8. The vibration device according to claim 1, wherein the vibrating body includes a plurality of piezoelectric elements on a side surface of the second cylindrical body and is configured to vibrate in a direction perpendicular or substantially perpendicular to the axial direction of the second cylindrical body.

9. The vibration device according to claim 1, further comprising an excitation circuit to excite the vibrating body.

10. A vibration device comprising:
a light transmissive body to transmit light of a predetermined wavelength;
a first cylindrical body having a cylindrical shape including a first end and a second end in an axial direction of the first cylindrical body, and supporting the light transmissive body at the first end;
a plate-shaped spring portion supporting the second end of the first cylindrical body;
a second cylindrical body having a cylindrical shape including a first end and a second end in an axial direction of the second cylindrical body, and supporting, at the first end, a position of the spring portion in an outer side portion of a position at which the first cylindrical body is supported; and
a vibrating body on the second end side of the second cylindrical body to vibrate in the axial direction of the second cylindrical body;
wherein
the light transmissive body includes a main body portion on an inner side of a portion supported by the first cylindrical body, and a protruding portion extending from the main body portion toward an outer circumference of the light transmissive body and protruding outward more than a portion supported by the first cylindrical body;
a ratio between a weight of the protruding portion and a weight of the main body portion is equal to or more than about 0.8 and equal to or less than about 1.2; and
a resonant frequency of the light transmissive body is larger than a resonant frequency of the spring portion.

11. The vibration device according to claim 10, wherein a material of the protruding portion is different from a material of the main body portion.

12. The vibration device according to claim 10, wherein the protruding portion includes at least one weight.

13. The vibration device according to claim 10, wherein the vibrating body includes:
a plate-shaped vibration plate extending outward from the second end of the second cylindrical body; and
a piezoelectric element on an upper surface or a lower surface of the vibration plate.

14. The vibration device according to claim 13, wherein
the light transmissive body has a disk shape or a dome shape; and
the spring portion, the vibration plate, and the piezoelectric element have an annular plate shape.

15. The vibration device according to claim 10, wherein the vibrating body includes:
a plate-shaped vibration plate extending inward from the second end of the second cylindrical body; and
a piezoelectric element on an upper surface or a lower surface of the vibration plate.

16. The vibration device according to claim 15, wherein
the light transmissive body has a disk shape or a dome shape; and
the spring portion, the vibration plate, and the piezoelectric element have an annular plate shape.

17. The vibration device according to claim 10, wherein the vibrating body includes a plurality of piezoelectric elements on side surfaces of the second cylindrical body and is configured to vibrate in a direction perpendicular or substantially perpendicular to the axial direction of the second cylindrical body.

18. The vibration device according to claim 10, further comprising an excitation circuit to excite the vibrating body.

19. A vibration control method comprising:
preparing a vibration device including a light transmissive body to transmit light of a predetermined wavelength, a first cylindrical body that has a cylindrical shape including a first end and a second end in an axial direction of the first cylindrical body and supports the light transmissive body at the first end, a plate-shaped spring portion that supports the second end of the first cylindrical body, a second cylindrical body that has a cylindrical shape including a first end and a second end in an axial direction of the second cylindrical body and supports, at the first end, a position of the spring portion in an outer side portion of a position at which the first cylindrical body is supported, and a vibrating body on the second end side of the second cylindrical body to vibrate in the axial direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body; and
vibrating the vibrating body; wherein
the preparing includes setting a ratio between an equivalent mass calculated from a moment of inertia of the protruding portion and a weight of the main body portion to equal to or more than about 0.8 and equal to or less than about 1.2, and configuring the light transmissive body, the first cylindrical body, the spring portion, and the second cylindrical body such that a resonant frequency of the light transmissive body is larger than a resonant frequency of the spring portion.

20. A vibration control method comprising:
preparing a vibration device including a light transmissive body to transmit light of a predetermined wavelength, a first cylindrical body that has a cylindrical shape including a first end and a second end in an axial direction of the first cylindrical body and supports the light transmissive body at the first end, a plate-shaped spring portion that supports the second end of the first cylindrical body, a second cylindrical body that has a cylindrical shape including a first end and a second end in an axial direction of the second cylindrical body and supports, at the first end, a position of the spring portion in an outer side portion of a position at which the first cylindrical body is supported, and a vibrating body on the second end side of the second cylindrical body to vibrate in the axial direction of the second cylindrical body, wherein the light transmissive body includes a main body portion on an inner side of a portion supported by the first cylindrical body, and a protruding portion extending from the main body portion toward an outer circumference of the light transmissive body and protruding outward more than a portion supported by the first cylindrical body; and vibrating the vibrating body; wherein the preparing includes setting a ratio between a weight of the protruding portion and a weight of the main body portion to equal to or more than about 0.8 and equal to or less than about 1.2, and configuring the light transmissive body, the first cylindrical body, the spring portion, and the second cylindrical body such that a resonant frequency of the light transmissive body is larger than a resonant frequency of the spring portion.

* * * * *